(12) United States Patent
Korver et al.

(10) Patent No.: US 11,727,443 B2
(45) Date of Patent: *Aug. 15, 2023

(54) MOBILE DEVICE DETECTION AND TRACKING

(71) Applicant: BLUEZOO, INC., Menlo Park, CA (US)

(72) Inventors: Jan Willem Korver, AC Utrecht (NL); Thomas Sandholm, Saratoga, CA (US); Philippe Rene Morin, Goleta, CA (US); Thibault de Lacheze-Murel, San Mateo, CA (US); Guillaume Tenant de la Tour, Saratoga, CA (US); Paul-Ambroise Augustin Duquenne, Versailles (FR); Jerome Lejeune, Saratoga, CA (US); Amanda Mills, Menlo Park, CA (US); Thuong Ho, San Jose, CA (US); Hang Ung, Saratoga, CA (US)

(73) Assignee: BLUEZOO, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,729

(22) Filed: Oct. 7, 2021

(65) Prior Publication Data
US 2022/0027950 A1 Jan. 27, 2022

Related U.S. Application Data

(63) Continuation of application No. 16/249,760, filed on Jan. 16, 2019, now Pat. No. 11,151,611, which is a (Continued)

(51) Int. Cl.
*H04W 4/33* (2018.01)
*H04W 4/21* (2018.01)
(Continued)

(52) U.S. Cl.
CPC ..... *G06Q 30/0267* (2013.01); *G06Q 30/0261* (2013.01); *H04L 67/02* (2013.01);
(Continued)

(58) Field of Classification Search
CPC ............ G06Q 30/0267; G06Q 30/0261; H04L 67/02; H04L 67/22; H04L 67/26;
(Continued)

(56) References Cited

U.S. PATENT DOCUMENTS

| 5,802,521 A | 9/1998 | Ziauddin et al. |
| 7,733,836 B2 | 6/2010 | Huseth et al. |

(Continued)

FOREIGN PATENT DOCUMENTS

| RU | 2011127863 A | 1/2013 |
| RU | 126862 U1 | 4/2013 |

(Continued)

*Primary Examiner* — Mohammed Waliullah
(74) *Attorney, Agent, or Firm* — Casimir Jones, S.C.; Kelly A. Barton

(57) ABSTRACT

Disclosed is a technique for passively monitoring the number of guests in a rental property. Mobile device broadcasts intended for connecting the device to a wireless network contain information about that device. This information includes unique identifiers such as MAC addresses. Detecting these broadcasts and filtering out those devices that are expected enables a property owner to have a semi-accurate number of guests within their property without actually being at the property, or visibly observing the guests in an obtrusive fashion. Guests are able to enjoy themselves in privacy and the property owner is able to monitor the safety of their property.

20 Claims, 31 Drawing Sheets

Related U.S. Application Data continuation-in-part of application No. 15/989,134, filed on May 24, 2018, now abandoned, and a continuation-in-part of application No. 15/879,221, filed on Jan. 24, 2018, now abandoned, and a continuation-in-part of application No. 15/823,478, filed on Nov. 27, 2017, now Pat. No. 10,440,505, and a continuation-in-part of application No. 15/803,689, filed on Nov. 3, 2017, now abandoned, which is a continuation-in-part of application No. 15/792,699, filed on Oct. 24, 2017, now abandoned, and a continuation of application No. 15/426,945, filed on Feb. 7, 2017, now Pat. No. 9,936,357, and a continuation-in-part of application No. 15/426,953, filed on Feb. 7, 2017, now Pat. No. 10,395,278, which is a continuation-in-part of application No. 15/006,057, filed on Jan. 25, 2016, now Pat. No. 9,769,625.

(60) Provisional application No. 62/539,868, filed on Aug. 1, 2017, provisional application No. 62/535,830, filed on Jul. 22, 2017, provisional application No. 62/292,812, filed on Feb. 8, 2016, provisional application No. 62/107,193, filed on Jan. 23, 2015.

(51) Int. Cl.

| | |
|---|---|
| *H04L 67/54* | (2022.01) |
| *H04W 4/06* | (2009.01) |
| *H04L 9/40* | (2022.01) |
| *G06Q 30/0251* | (2023.01) |
| *H04W 4/30* | (2018.01) |
| *H04W 12/08* | (2021.01) |
| *H04W 4/14* | (2009.01) |
| *H04W 4/02* | (2018.01) |
| *H04L 67/02* | (2022.01) |
| *H04L 67/55* | (2022.01) |
| *H04L 67/50* | (2022.01) |
| *H04W 12/12* | (2021.01) |

(52) U.S. Cl.
CPC ............ *H04L 67/535* (2022.05); *H04L 67/54* (2022.05); *H04L 67/55* (2022.05); *H04W 4/02* (2013.01); *H04W 4/14* (2013.01); *H04W 4/21* (2018.02); *H04W 4/30* (2018.02); *H04W 4/33* (2018.02); *H04W 12/08* (2013.01); *H04L 63/1425* (2013.01); *H04W 4/06* (2013.01); *H04W 12/12* (2013.01)

(58) Field of Classification Search
CPC ...... H04L 67/24; H04L 63/1425; H04W 4/02; H04W 4/14; H04W 12/08; H04W 4/30; H04W 4/21; H04W 4/33; H04W 4/06; H04W 12/12
See application file for complete search history.

(56) References Cited

U.S. PATENT DOCUMENTS

| | | | |
|---|---|---|---|
| 7,856,656 B1 | 12/2010 | Kharvandikar et al. | |
| 9,344,992 B2 | 5/2016 | Noonan et al. | |
| 9,769,625 B2 | 9/2017 | Tenant De La Tour et al. | |
| 9,936,357 B2 | 4/2018 | Mills et al. | |
| 2004/0193763 A1 | 9/2004 | Iizuka et al. | |
| 2004/0199535 A1 | 10/2004 | Zuk | |
| 2007/0274267 A1 | 11/2007 | Tiedemann et al. | |
| 2008/0067244 A1* | 3/2008 | Marks .................. | G01V 15/00 235/385 |
| 2011/0239299 A1 | 9/2011 | Chen et al. | |
| 2011/0274070 A1 | 11/2011 | Xia et al. | |
| 2012/0136846 A1 | 5/2012 | Song et al. | |
| 2012/0190325 A1 | 7/2012 | Suhayya et al. | |
| 2013/0058274 A1 | 3/2013 | Scherzer et al. | |
| 2013/0084835 A1 | 4/2013 | Scherzer et al. | |
| 2013/0132271 A1 | 5/2013 | Daniel | |
| 2013/0273938 A1 | 10/2013 | Ng et al. | |
| 2013/0290200 A1 | 10/2013 | Singhal et al. | |
| 2014/0033288 A1 | 1/2014 | Wynn | |
| 2014/0189808 A1 | 7/2014 | Mahaffey et al. | |
| 2014/0195380 A1 | 7/2014 | Jamtgaard et al. | |
| 2014/0350883 A1 | 11/2014 | Carter et al. | |
| 2015/0025937 A1 | 1/2015 | Turner, Jr. | |
| 2015/0103678 A1 | 4/2015 | Fisbein et al. | |
| 2015/0154218 A1 | 6/2015 | Attaluri et al. | |
| 2015/0304283 A1 | 10/2015 | Hallett et al. | |
| 2015/0356594 A1 | 12/2015 | Lusted et al. | |
| 2016/0110833 A1* | 4/2016 | Fix ......................... | G06Q 50/16 705/324 |
| 2016/0134924 A1* | 5/2016 | Bush ................... | H04N 21/4431 725/10 |
| 2016/0142315 A1 | 5/2016 | Tomonaga et al. | |
| 2016/0156716 A1* | 6/2016 | Murakami .......... | H04L 67/1097 709/217 |
| 2016/0165514 A1* | 6/2016 | Lou ....................... | H04W 4/025 370/328 |
| 2016/0219411 A1 | 7/2016 | Tenant De La Tour et al. | |
| 2016/0269930 A1 | 9/2016 | Huang et al. | |
| 2016/0286624 A1 | 9/2016 | Patel et al. | |
| 2016/0337917 A1 | 11/2016 | Kawai et al. | |
| 2017/0011348 A1 | 1/2017 | Ziskind et al. | |
| 2017/0012935 A1 | 1/2017 | Raman et al. | |
| 2017/0024763 A1 | 1/2017 | Liu et al. | |
| 2017/0041744 A1 | 2/2017 | Mkay | |
| 2017/0091441 A1 | 3/2017 | Moore et al. | |
| 2017/0094559 A1* | 3/2017 | Buyuktosunoglu ..... | H04L 43/16 |
| 2017/0125888 A1 | 5/2017 | Rubin et al. | |
| 2017/0148063 A1 | 5/2017 | Ung et al. | |
| 2017/0149741 A1 | 5/2017 | Hallet et al. | |
| 2017/0150325 A1 | 5/2017 | Mills et al. | |
| 2017/0257821 A1 | 9/2017 | Smith | |
| 2018/0077572 A1 | 3/2018 | Trappitt | |

FOREIGN PATENT DOCUMENTS

| | | |
|---|---|---|
| WO | WO 2014/035307 A1 | 3/2014 |
| WO | WO 2014/035308 A1 | 3/2014 |
| WO | WO 2017/075444 A1 | 5/2017 |
| WO | WO 2017/075481 A1 | 5/2017 |

\* cited by examiner

```
IEEE 802.11 Probe Request, Flags: ........C
   Type/Subtype: Probe Request (0x0004)
 » Frame Control Field: 0x4000
   .000 0000 0000 0000 = Duration: 0 microseconds
   Receiver address: Broadcast (ff:ff:ff:ff:ff:ff)
   Destination address: Broadcast (ff:ff:ff:ff:ff:ff)
   Transmitter address: 76:a5:17:35:5f:05 (76:a5:17:35:5f:05)
   Source address: 76:a5:17:35:5f:05 (76:a5:17:35:5f:05)
   BSS Id: Broadcast (ff:ff:ff:ff:ff:ff)
   .... .... .... 0000 = Fragment number: 0
   0111 1001 0010 .... = Sequence number: 1938
   Frame check sequence: 0xee310b2d [correct]
   [FCS Status: Good]
IEEE 802.11 wireless LAN management frame
 ▼ Tagged parameters (135 bytes)
   » Tag: SSID parameter set: Broadcast
   » Tag: Supported Rates 6, 9, 12, 18, 24, 36, 48, 54, [Mbit/sec]
   » Tag: HT Capabilities (802.11n D1.10)
   » Tag: Extended Capabilities (4 octets)
   » Tag: Interworking
   » Tag: VHT Capabilities (IEEE Std 802.11ac/D3.1)
   » Tag: Vendor Specific: Apple
   » Tag: Vendor Specific: Epigram: HT Capabilities (802.11n D1.10)
   » Tag: Vendor Specific: Microsof: Unknown 8
   » Tag: Vendor Specific: Broadcom
```

*FIG. 29*

MOBILE DEVICE DETECTION AND TRACKING

CLAIM FOR PRIORITY

This application is a continuation-in-part application of U.S. patent application Ser. No. 15/803,689, entitled "Protected PII of Mobile Device Detection and Tracking," filed Nov. 3, 2017, which is a continuation-in-part of Ser. No. 15/792,699, entitled "Scalability Improvements of People-Counting Sensor Networks," and filed Oct. 24, 2017, which claims priority to U.S. Provisional Application No. 62/535,830, entitled "Mobile Device Detection and Tracking," and filed Jul. 22, 2017, all of which are incorporated herein in their entirety.

This application is a continuation-in-part application of U.S. patent application Ser. No. 15/823,478, entitled "Passive and Active Techniques for People-Counting," and filed Nov. 27, 2017, which is incorporated herein in its entirety.

This application is a continuation-in-part application of U.S. patent application Ser. No. 15/989,134, entitled "Mobile Device Detection and Tracking," and filed May 24, 2018, which claims priority to U.S. Provisional Application No. 62/535,830, entitled "Mobile Device Detection and Tracking," and filed Jul. 22, 2017 and U.S. Provisional Application No. 62/539,868, entitled "Mobile Device Detection and Tracking," and filed Aug. 1, 2017, all of which are incorporated herein in their entirety.

This application is a continuation-in-part application of U.S. patent application Ser. No. 15/426,953, entitled "Mobile Device Detection and Engaging," and filed Feb. 7, 2017, which is a continuation-in-part of U.S. patent application Ser. No. 15/006,057, entitled "Mobile Device Detection and Tracking," and filed on Jan. 25, 2016 and now issued as U.S. Pat. No. 9,769,625 and issued on Sep. 19, 2017, which claims priority to U.S. Provisional Application No. 62/292,812, entitled "System and Method for Managing Digital Display Systems, and filed Jan. 23, 2015, all of which are incorporated herein in their entirety. In addition, U.S. patent application Ser. No. 15/426,953 claims priority to U.S. Provisional Application No. 62/292,812, entitled "Mobile Device Detection and Tracking," and filed Feb. 8, 2016.

The application is a continuation-in-part application of U.S. patent application Ser. No. 15/879,221, entitled "Mobile Device Detection and Tracking," and filed Jan. 24, 2018, which is a continuation application of U.S. patent application Ser. No. 15/426,945, entitled "Mobile Device Detection and Tracking," filed Feb. 7, 2017, which is a continuation-in part application of U.S. patent application Ser. No. 15/006,057 entitled "Mobile Device Detection and Tracking," filed Jan. 25, 2016 and now issued as U.S. Pat. No. 9,769,625 and issued on Sep. 19, 2017, which claims priority to U.S. Provisional Application No. 62/107,193, entitled "System and Method for Managing Digital Display Systems," filed Jan. 23, 2015; and U.S. Provisional Application No. 62/292,812, entitled "Mobile Device Detection and Tracking," filed Feb. 8, 2016, all of which are incorporated by reference herein in their entirety.

TECHNICAL FIELD

Teachings relate to electronic data management and more specifically, but not exclusively, to unobtrusively tracking mobile devices without installed applications or opt-in applications.

BACKGROUND

Bed and breakfasts, condos, time shares, and other rental properties have an issue with unauthorized parties. Property owners often do not have a close relationship with their guests and renters, but in order to conduct a business must extend trust of their property anyway. Sometimes guests take advantage of that trust and invite unauthorized individuals to come onto the property, causing physical damage to the property or reputational damage with neighbors and police. Owners wish to mitigate property damage, though in a way that respects the privacy of their guests without overburdening management at a given property.

BRIEF DESCRIPTION OF THE DRAWINGS

FIG. 29 is a sample network probe.

DETAILED DESCRIPTION

Disclosed herein is a technique to help property owners monitor their property in a way that respects the privacy of their guests without overburdening management. In order to achieve these goals, the technique involves the use of a device that counts the local number of wireless/mobile devices and reports this number to a master device. Further, thresholds may be set up to trigger notifications (such as push or SMS). Settings for the device can be handled by the master device (e.g., a mobile phone including a paired application).

Mobile devices such as cellular phones, tablets, or other portable networked devices emit signals in Bluetooth, WiFi, and cellular (i.e. 2G, 3G, 4G, Edge, H+, etc.). These signals attempt to connect to paired devices, hotspots, cell towers, or other suitable wireless connection points to greater networks ("hotspots"). In order to connect to hotspots, mobile devices send out identifying data to establish a connection.

If the mobile device is tricked into attempting to connect with a network transceiver disguised as a hotspot, the fake hotspot may unobtrusively collect the identification data of the mobile device and then reject the connection request. The fake hotspot collects data in real-time on the mobile device, and by association, collects data regarding the human carrying the mobile device. This data collection occurs without alerting or impeding the human carrier. The system uses analytical software to determine, for example, an approaching unique ID user's presence, history, frequency of visits, duration of presence, and so on. The type of data available to the fake hotspots varies based on a number of details, such as the kind of hotspot used.

Figure 1:
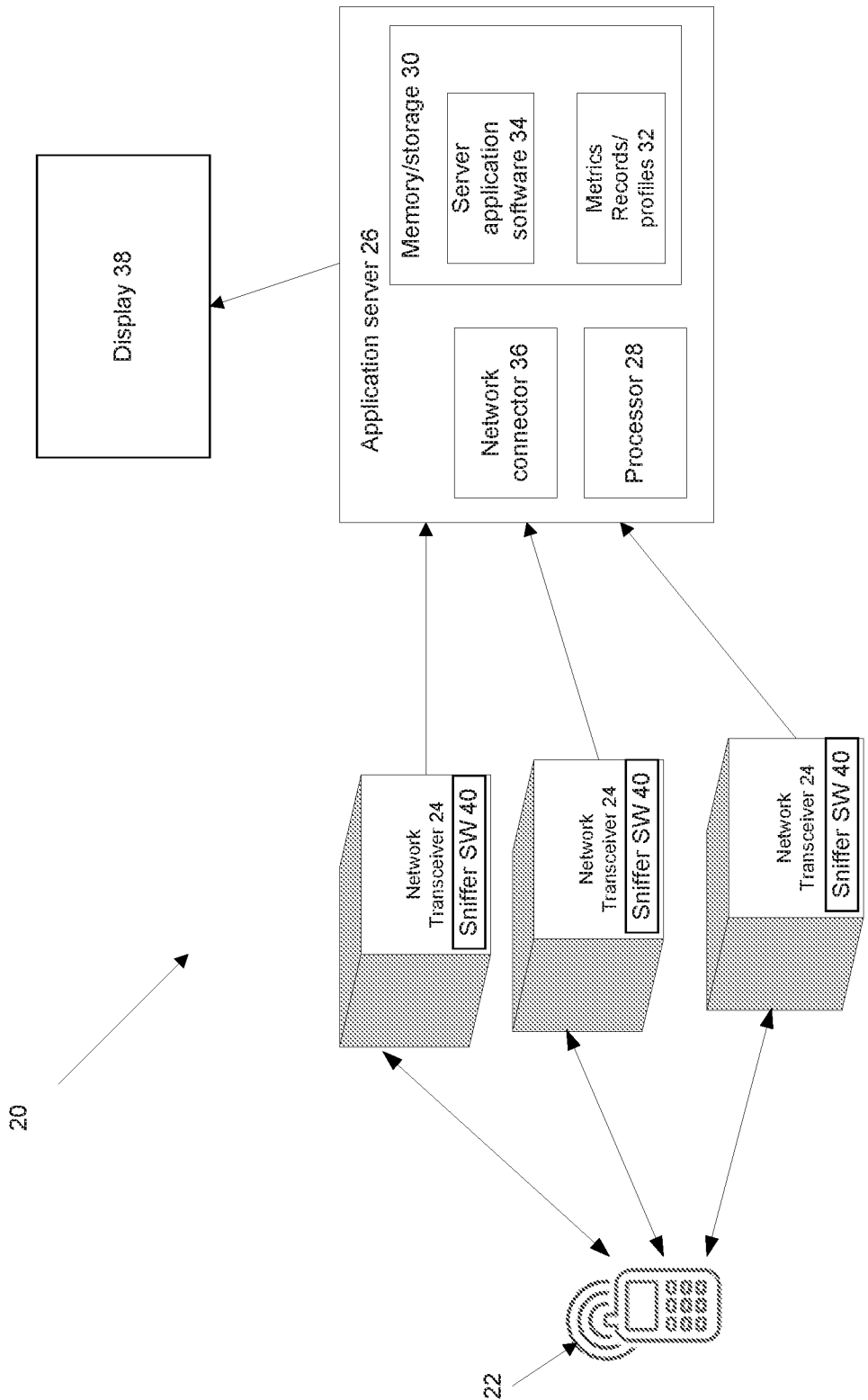
FIG. 1 is an exemplary top-level block diagram illustrating an embodiment of a mobile detection system.

FIG. 1 is an exemplary top-level block diagram illustrating an embodiment of mobile detection system 20. The system 20 relates to mobile devices 22 carried on a user's person. The mobile devices 22 are detected by network transceivers 24. Network transceivers 24 are detection devices or mobile stations (MS), which colloquially can be referred to as fake hotspots or sniffers, that collect identification data from mobile devices 22. Data collected by the network transceivers 24 is forwarded to an application server 26 via the Internet. The application server 26 includes a processor 28 and a data storage or memory 30 for logging metrics 32 and running application analytical software 34. The results of the analysis of metrics 32 are displayed or rendered to a user on a display 38.

In some embodiments, a dashboard selects and controls data that is received from the network transceivers 24 at the application server 26. The dashboard can control, from a distance, data captured by the network transceivers 24 as well as new visitor characteristics, history of data used, the number of mobile devices that can be sensed, demographics regarding a selected user, and so on.

The network transceivers 24 may include a plurality of sensors and communicative devices. Examples include wireless fidelity (WiFi) sensors, cell signal 2G, and Femto sensors for 3G and 4G for sensing a user's mobile device 22.

Mobile devices 22 emit WiFi signals automatically. WiFi signals carry identifying data including the MAC address (unique ID number), power of the signal, distance of mobile device 22 from the network transceiver 24, brand of the mobile device 22, name of the mobile device 22 (given by the user), and the network name the mobile device 22 used to connect.

Cell signals (2G, 3G, 4G, etc.) emitted by a phone also occur automatically. The network transceivers 24 detect this signal with an active action on a regular basis to collect the MAC address (unique ID number), SIM card number (IMSI), power of the signal, distance of mobile device 22 from network transceiver 24, carrier, nationality of the mobile device 22, list of applications which attempt to update, and the addresses of the web pages already open (or cached) on the mobile device 22.

Cell signal in this case refers to both CDMA and GSM type networks. While normally CDMA networks would not necessarily use mobile devices 22 with SIM cards, SIM cards exist in devices that use 4G LTE signals. Additionally, in the U.S., CDMA carriers use network-based whitelists to verify their subscribers. The mobile device 22 will still have a unique ID for the carrier to use for identification.

FIG. 1 includes three network transceivers 24. In order to locate the location of a given mobile device 22, knowing the distance between the desired location and three known locations enables a triangulation calculation to determine the desired location. To triangulate, a minimum of three fake hotspots is required. In practice, a user may want additional fake hotspots scattered throughout a given area or building to improve coverage or accuracy. At the time of this disclosure, lower quality network transceiver sensors have a roughly 150-foot range. As the cost of components changes with time, the optimal density of network transceivers 24 required to balance the effectiveness and cost within a bounded area/building would vary.

The network transceivers may additionally include processors 28 for internal operations and/or for accepting some of the analytical processing load from the application server 26. Network transceivers 24 may also employ sniffer software 40. Sniffer software 40 includes program operations of the network transceivers 24 as well as network protocol software. Examples of network protocol software include adaptations of OpenBTS (Open Base Transceiver System) and OpenBSC (Open Base Station Controller), with additional features as taught herein. OpenBTS is stable, more complete for GSM, and has a release for UMTS (Universal Mobile Telecommunications System). OpenBTS includes the functionality to perform complete man-in-the-middle attacks. It is worth noting that OpenBSC makes use of OpenBTS for its BTS functionalities.

Using OpenBTS software, examples of base model hardware that may be used for the network transceiver are adaptations of communications platforms manufactured by Ettus Research, Fairwaves, and Nuand.

Figure 8:
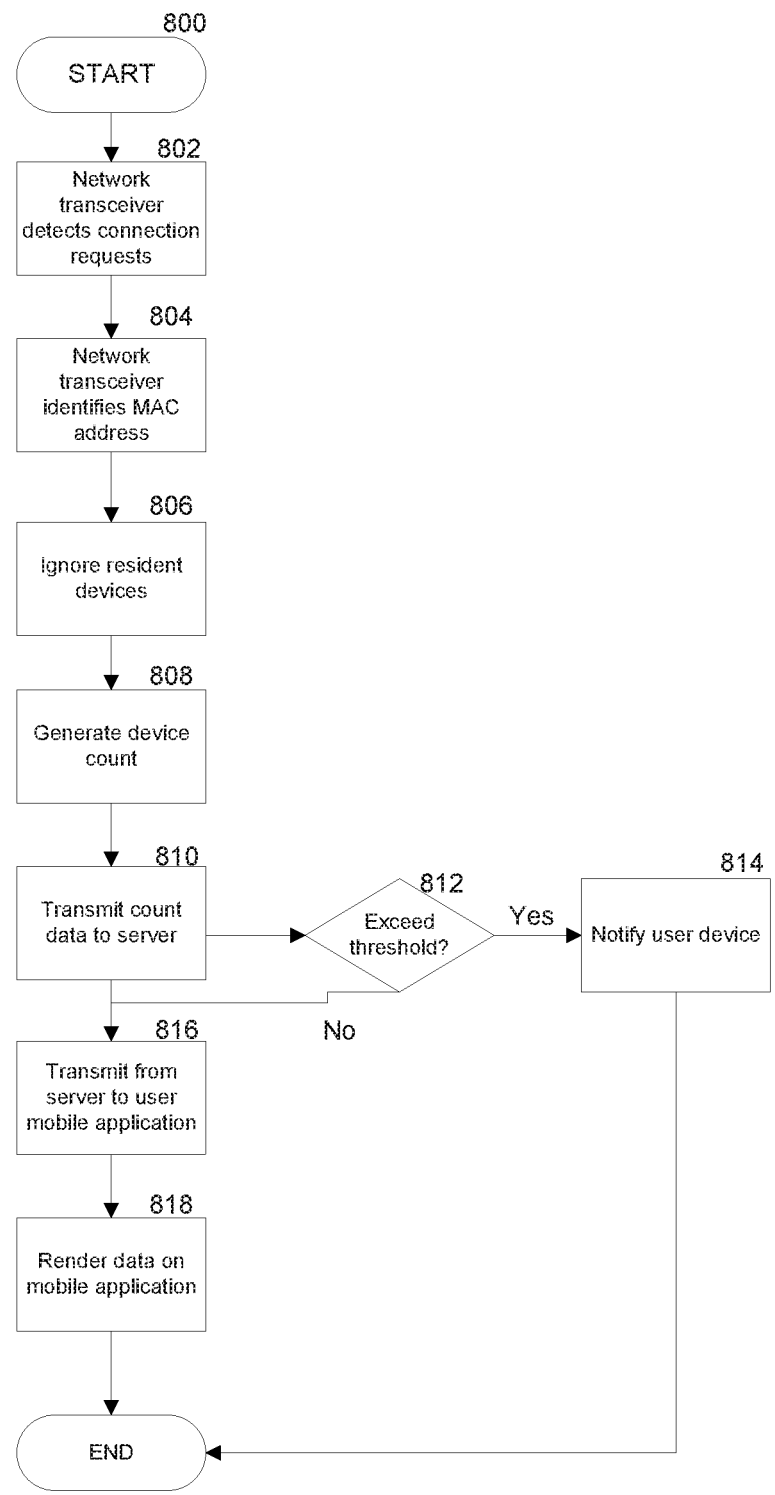
FIG. 8 is a flowchart illustrating a method for visitor counting.

The WiFi sniffer software 40 exists on a WiFi card. This sniffer software 40 configures the WiFi adapter into a monitor mode and displays continuously without any treatment or interruption. All the MAC addresses and RSSI values of mobile devices 22 are detected and no data is thrown away. A pattern length corresponds to the quantity of signals captured by the WiFi adapter. The curve representing the RSSI values of these signals is shown in FIG. 8. There is a variation in the signal strength over a given time (less than a second); however, when the sniffer software 40 is configured to check every millisecond, the network transceiver 24 captures the majority of the signal emitted by the mobile devices 22.

Some phone brands (ex: Apple) use a randomized MAC address. They will provide a number of fake MAC addresses along with the real one in an attempt to hide the real number. However, the random MAC addresses change whereas the real one does not. A data filter compares the MAC address for a given mobile device received over a plurality of network connection requests and removes device ID numbers which do not appear repeatedly. Consistent existence of a particular MAC address signifies a real address.

For cellular signals, there are two distinguishable cases: idle mode and non-idle mode. In idle mode, the mobile device 22 performs the selection and re-selection of a base station to make sure that the mobile device 22 is attached with the best possible channel to the carrier network. In non-idle mode, a mobile device 22, with a point-to-point active call, will perform a base station handover to assure that the call is not dropped.

In order for the mobile device 22 to choose to identify itself to the network transceivers 24, the mobile device 22 has to reselect the cell managed by the network transceivers 24 and push them to identify/authenticate. A set of criteria is defined in the standard mobile phone regarding this selection/re-selection procedure. A BCCH frequency scan can be described as follows: the mobile device 22 scans a set of frequencies to detect a BCCH frequency to camp on. Criteria for cell eligibility can be selected or re-selected. These cells include timing information. In some embodiments, every five seconds, the network transceiver 24 calculates the parameters for the serving cell and for non-serving cells.

GSM, UTRAN, and/or LTE (2G, 3G, 4G) cell reselection is feasible. Therefore, within the sniffer software 40 are programmed, unique approaches for each. According to the network requests, a network transceiver 24 provides specific identification parameters to a fake network (e.g., IMSI or IMEI). The network initiates the identification procedure by transferring an IDENTITY REQUEST message to the network transceiver 24 and starts a timer T3270. The IDENTITY REQUEST message specifies the requested identification parameters in the identity type information element. The IMSI and/or IMEI may be requested.

In some embodiments, the data network includes a wired data network and/or any category of conventional wireless communication networks; for example, radio, Wireless Fidelity (WiFi), cellular, satellite, and broadcasting networks. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

The sensors can acquire data on the media access control (MAC address), signal strength, timestamp of probes received, and so on, from the mobile device. In some embodiments, the sensors can be integrated into the display device and/or placed as a separate unit collecting data metrics per location and uploading them to the central server. Additional sensors improve the accuracy of the wireless metrics as well as cover multiple areas within a location. Other sensors that can be used include Bluetooth, GSM/2G, and so on.

Figure 2:
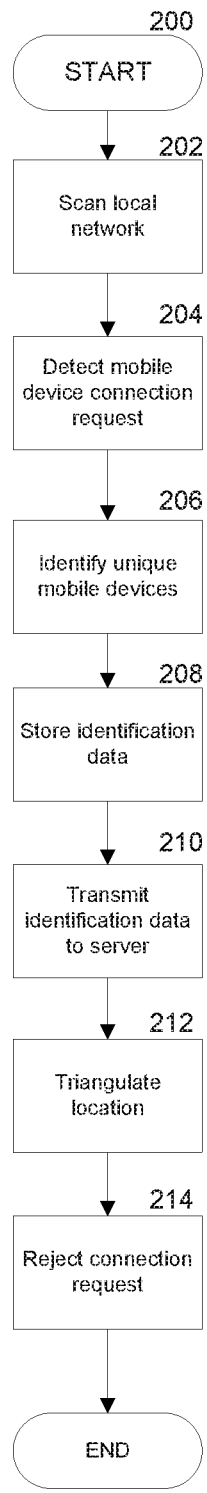
FIG. 2 is a flowchart illustrating a method of detecting a mobile device.

FIG. 2 is a flowchart illustrating a method of detecting a mobile device. In step 202, when turned on, the sniffer software 40 scans different frequencies (WiFi, Cellular, etc.) and collects the information broadcasted from the different PLMN's (Public Land Mobile Networks) cells, including the adjacent cells. The network transceivers 24 will also use this phase to take the necessary measurements to determine constants.

In step 204, the sniffer software 40 periodically catches all the IDs of the local mobile devices 22 in the zone of activity for the network transceiver 24. The period is identified by a CATCHER_PERIOD and is determined based on experimental measurements (e.g., number of active PLMNs and corresponding cell characteristics in the zone of activity). Broadcast for a duration CATCHER_DURATION_PER_PLMN BCCH information is on a frequency adjacent to the GSM range. The power of transmission CATCHER_TRANSMIT_POWER_PER_PLMN is computed with precision based on the collected information.

In step 206, a radio resource (RR) connection with each mobile station attached to the current PLMN requests identification. The different mobile devices 22 respond with the requested IDs: TMSI, IMSI, and/or IMEI. In step 208, the collected IDs are stored, and in step 210, the IDs of mobile devices 22 are transmitted to the application level and the application server 26.

In step 212, based on the communication between the mobile device 22 and the network transceivers 24, the mobile device's location is triangulated. In step 214, the network transceiver 24 terminates the RR connections requesting that mobile devices 22 return to the previous BCCH.

Figure 3:
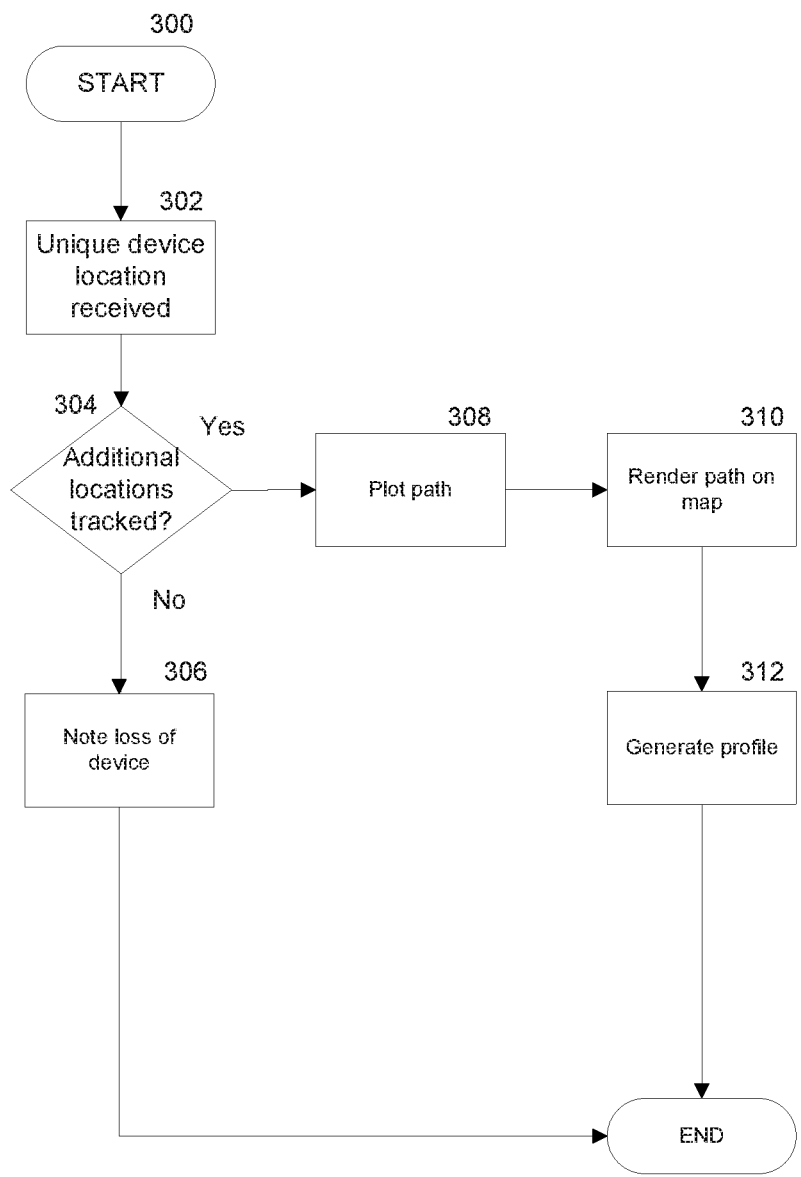
FIG. 3 is a flowchart illustrating a method of tracking a mobile device.

FIG. 3 is a flowchart illustrating a method of tracking a mobile device. In step 302, a first data set from the method of FIG. 2 is collected by the sniffer software 40 and/or the server's application software 34. Then, in step 304, the software 40 determines whether or not additional locations are tracked for the same mobile device 22 (cycling through some of the steps of FIG. 2 over again). The determination of whether or not the same device is discovered is through comparison of the identification data received in repeated cycles of the method of FIG. 2.

In step 306, if the given mobile device 22 is no longer detected, the software 34 notes the loss of the mobile device. In step 308, if the given mobile device 22 remains in contact, the multiple locations are plotted as a path. If the mobile device 22 has not moved, the path includes a wait time or a "mill around in substantially the same area time."

In step 310, the path is rendered on a map of the area supported by the network transceivers 24. In step 312, a profile is generated for that given mobile device's ID information. The profile may include data such as: average visit duration (recent and historical), average dwell time, bypassing traffic, path taken, and new versus recurring visitors (recent and historical).

In some embodiments, the sensors report recent metrics 32 for the approaching user back to the central server 26. Advantageously, movement of the approaching user can be determined, for example, using MAC readings and calculating the distance to a selected sensor, taking into account the signal strength of a particular reading. Low signal strength readings can be filtered to reduce noise.

The central server 26 can include one or more probe controllers and/or location controllers (not shown). The probe controllers process the aggregate information from all network transceivers 24 and image capturing devices (not shown). The location controllers provide analytics for back-end historical data as well as end-point data for real-time, recurring visitor decisions. Readings can be stored in a database using any conventional data mapping methods. For example, readings stored include, but are not limited to, signal strength (e.g., received signal strength indication (RSSI)), timestamp, location ID, International Mobile Station Equipment Identity (IMEI), gender, attention time, timestamp, age, and proximity readings.

In some embodiments, the central server 26 provides a dashboard to enable secured access for an administrator. For example, HTTP secure connections can be used, and transport layer security/secure sockets layers can be used to provide authenticated access to the administrator. Additionally and/or alternatively, two-factor authentication can be used to provide a token and/or password to the administrator.

Once the administrator is authorized, the dashboard allows the administrator to select and control the data that is received at the central server 26. The administrator can access the dashboard at the central server 26 or through the data network.

Figure 4:
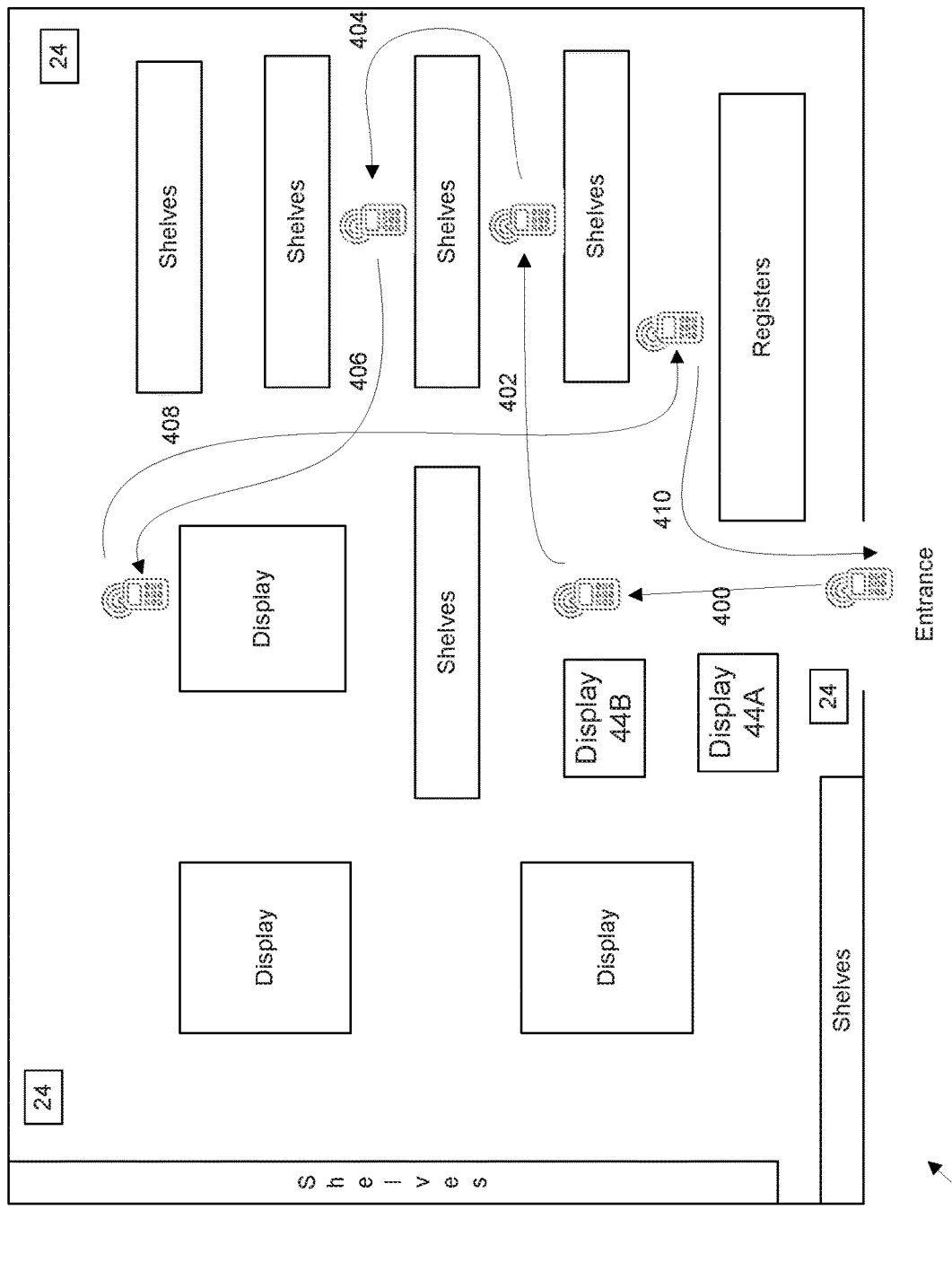
FIG. 4 is an exemplary sequence diagram tracking a mobile device through a store.

FIG. 4 is an exemplary sequence diagram tracking a mobile device through a store. The technology of analyzing people in real-time can be used as an efficient communication strategy in public environments (e.g., in corporate and campus locations). For example, organizations can adjust advertisements through collected metrics and analytic data.

In some embodiments, additional sensors are integrated into the system 20 to increase the number of metrics collected. Metrics are combined with advanced indexing and search algorithms, aggregations, and stochastics in order to provide the most complete insight into real-time audience demographics.

The exemplary process details providing analytics based on the real-time analysis of the proximate audience (e.g., approaching users, crowd, and so on). The central server 26 can determine if the approaching user is recurring or a "new visitor" based on aggregations of all the above-mentioned metrics. Stated in another way, the frequency of a user's visits is determined by creating a digital "footprint" of the user based on the metrics collected. In some embodiments, personal data is not stored, and the digital identifiers stored are associated with a particular MAC address. MAC addresses and devices can be aggregated based on a time slot (e.g., recent time slots include the last two minutes).

Each reading from the relevant time slot can be filtered by signal strength to determine mobile devices that are in actual proximity. These devices can be further filtered beginning from the current time slot and extending to an N-minute period after that (usually 24 hours in the past), which is in turn fully configurable. This can be used to determine whether a user is a recurring visitor. For additional security, digital identifiers can be encrypted and/or hashed.

Displayed in FIG. 4 is a building location 42. The building location 42 includes a number of network transceivers 24. The sequence steps 400-410 illustrate a single person's path through the store as mapped and rendered by the motion of their mobile device 22.

In sequence 400, the user enters the building location 42, goes straight past the first display 44A, and stops at the second display 44B. The analytic data derived from this can be that this one user of many was not interested in the display 44A. Instead, this user's interests were elsewhere.

In sequence steps 402 through 406, the user is tracked weaving through aisles. A marketer seeing this data can make determinations about the traffic flow in the store to potentially improve the natural routing of customers through the store. In sequence 408, the user has obtained what they intend to purchase and heads to the register, pays. In step 410 the user leaves.

The analytics also indicate how long the user spent at the register, and if they were in line, how the line was bunching up. This data can be used to further improve the orientation or management of the building location 42.

Figure 5:
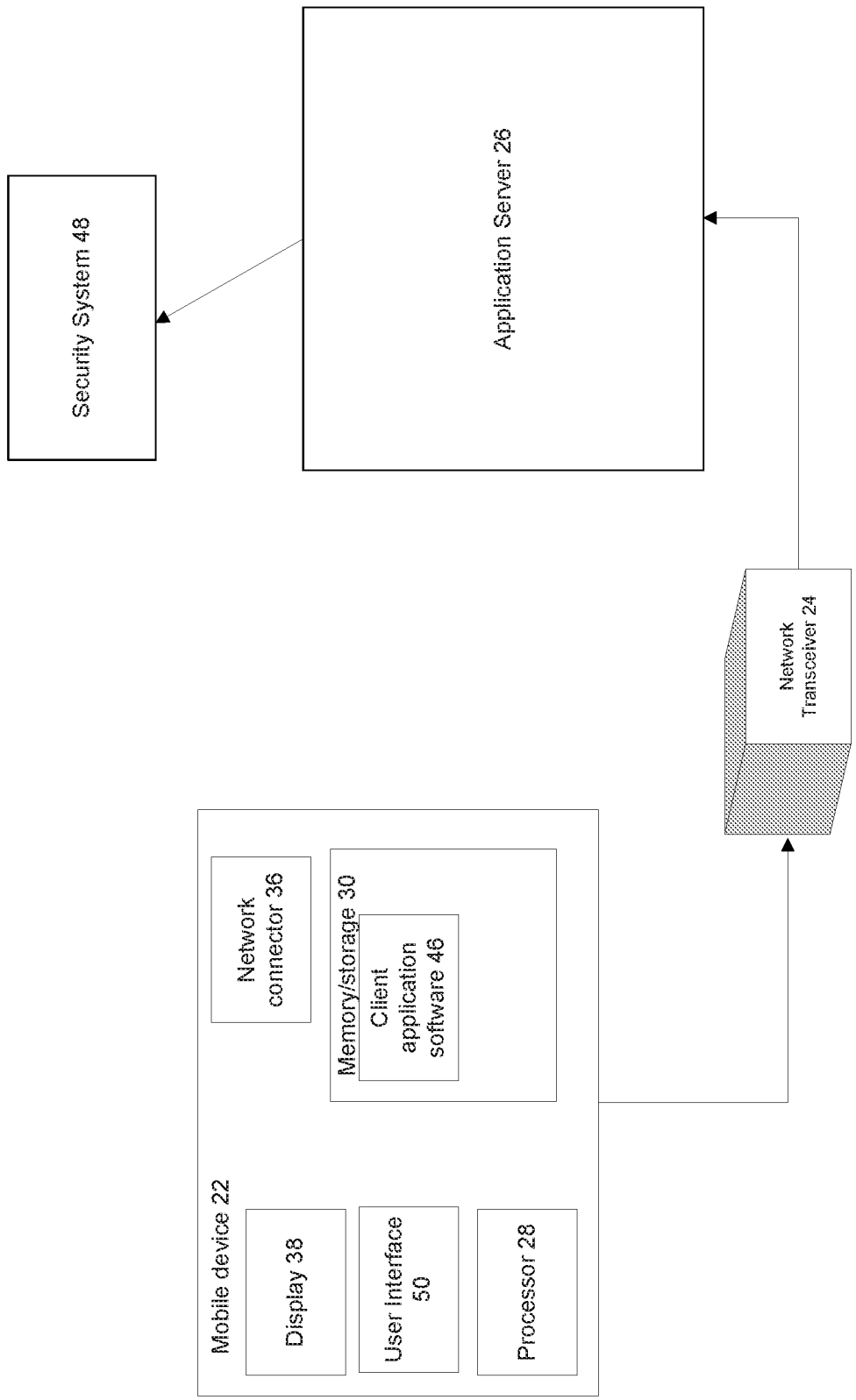
FIG. 5 is an exemplary top-level block diagram illustrating an embodiment of a mobile detection system integrated with a security system.

FIG. 5 is an exemplary top-level block diagram illustrating an embodiment of a mobile detection system integrated with a security system 48. Here, the mobile device 22 further includes installed client software 46. This embodiment differs from prior discussed embodiments where no such software was necessary in order for data to be collected. The client software 46 is not necessary for the security system 48 to work, but is one embodiment. What is necessary is that the security system is able to recognize whether the given mobile device 22 is associated with a given person or unknown through an IFF (identification friend or foe).

This can be done through a client application 46 programmed to embed the IFF data in the information that the user expects the network transceiver 24 to collect through the described "sniffing" process. As noted, the network transceivers 24 collect application names. The client application 46 is programmed to rename itself to a code which will be recognized as an IFF signal. Alternatively, the security system 48 may include a whitelist of MAC addresses, wherein no client application 46 is necessary, and the IFF signal is instead merely the MAC address.

Here, data collected in the application server 26 is analyzed, and directions are sent by the application server 26 to the security system 48 in order to cause security actions to occur (e.g., inform law enforcement, automatically lock doors, turn on lights, deliver messages, turn on cameras, activate traps, etc.).

Figure 6:
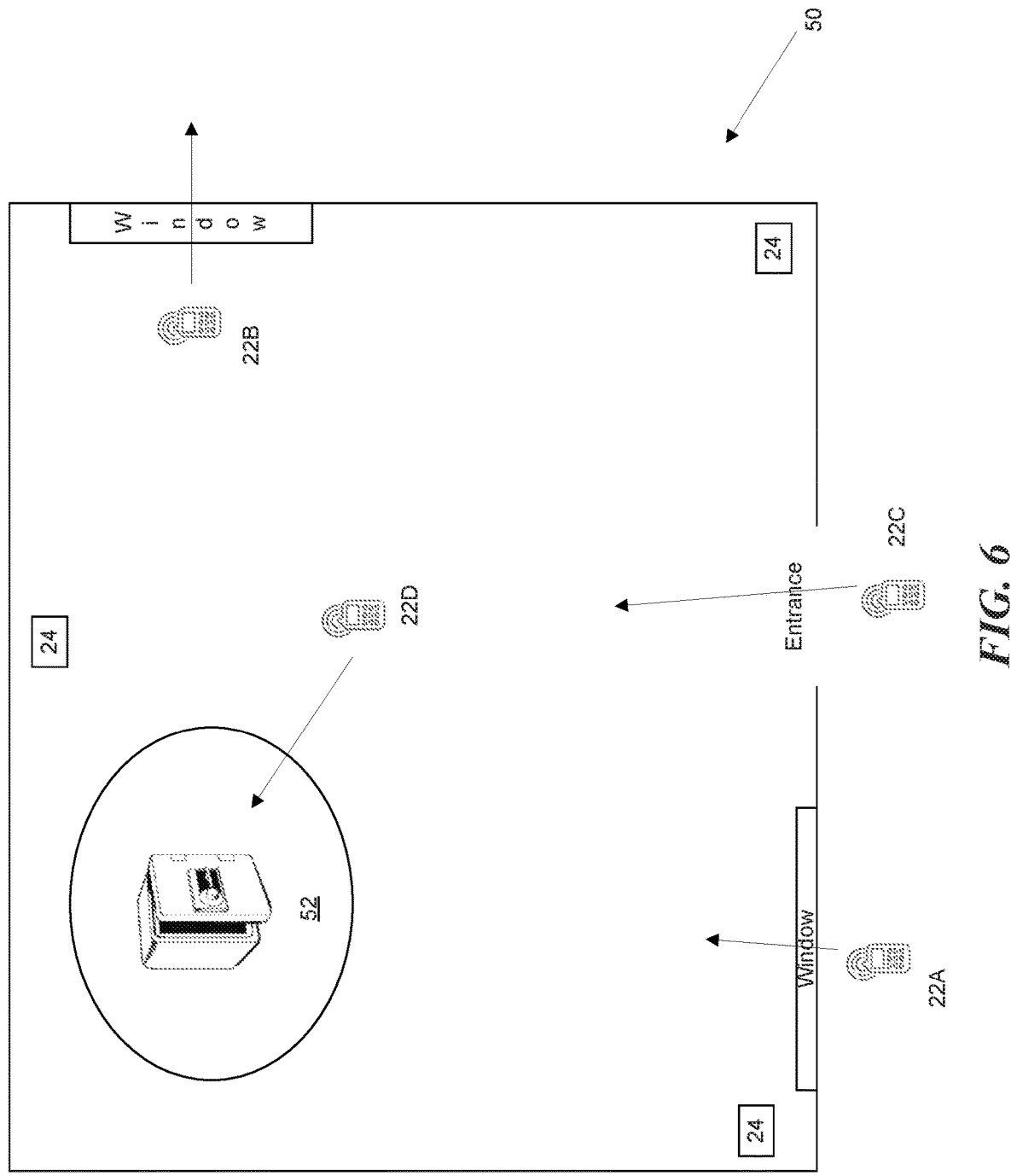
FIG. 6 is an illustrative implementation of a mobile device tracking system integrated with a security system.

FIG. 6 is an illustrative implementation of a mobile device tracking system integrated with a security system 48. Here, there is a user property 50. The user property may be any number of buildings: a domicile/house, an office building after hours, a bank, a military installation, or other region for which ingress and egress may be restricted. A number of sample stories are illustrated below for the technology addressed herein.

The mobile device 22A enters the user property 50 through a window. The velocity of the device 22A shows ingress instead of egress, implying possible unauthorized entry. The security system 48 may first check for an IFF signal, wherein the absence of the signal may trigger the system. In a domicile, this may be a burglar. The security system can capture the burglar's phone data, turn on security cameras, and call the police. Similar actions can be taken if an unknown device 22A is milling around outside the window.

The mobile device 22B leaves through a window. Similarly, in a domicile, this is not generally considered normal. Potentially, "little Timmy" is sneaking out when he should not be. In addition to the velocity of mobile device 22B, the time of day can be taken into account for such actions. Hypothetically, Timmy is allowed to leave through his window to get to his tree house during daylight, but not at 2:00 a.m. Here, even if an IFF signal is received, some other condition may override the IFF signal. Alternatively, IFF signals may not all be created equal. Mobile devices owned by Timmy's parents may not trigger the security system 48, while the mobile device 22B owned by Timmy does. In this circumstance, the security system 48 may send a text message to Timmy's parent's mobile devices, and the parents then head outside to confront the little miscreant.

The mobile device 22C enters straight through the front door of the user property 50. If the user property 50 is a business which should not be receiving visitors at 2:00 a.m., the security system 48 may be triggered. It is possible that the mobile device 22C has been previously tracked loitering around the user property 50 before. Upon that same device 22C approaching the main entrance, or any other entrance, the security system 48 is triggered.

The mobile device 22D is headed towards a valued zone 52. As before, an IFF signal may prevent the security system 48 from being triggered. Alternatively, without an IFF signal, and given a set of behavior/loitering in the valued zone 52, the security system 48 may trigger. Example actions include locking surrounding doors or dropping a cage trap over the valued zone 52, thereby sealing a thief in to await the authorities.

Figure 7:
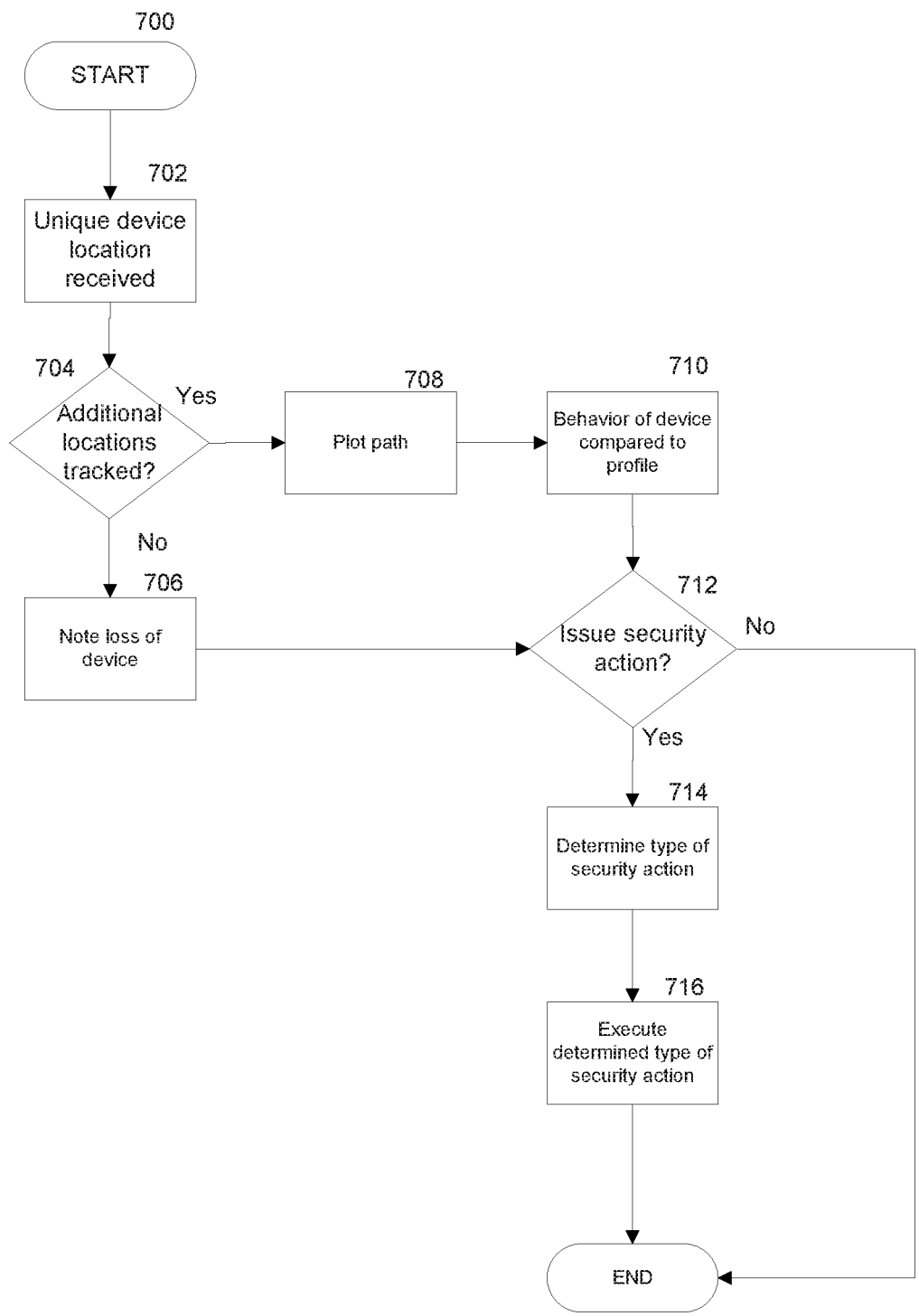
FIG. 7 is a flowchart illustrating a method of tracking a mobile device integrated with a security system.

FIG. 7 is a flowchart illustrating a method of tracking a mobile device integrated with a security system. Similar to FIG. 3, the network transceivers 24 collect one or more data points about the mobile devices 22 within range. In step 706, if a mobile device 22 suddenly vanishes from tracking that was expected to vanish based on predetermined security profiles, a potential security action may occur in step 712.

Alternatively, in step 710, a plotted path (both present and historical) of a mobile device 708 is compared to danger profiles. In step 712, if a danger profile appears to have been met, or if a mobile device 22 mysteriously vanished that shouldn't have, the security system 48 may trigger.

In step 714, if the security system 48 triggers, the system must determine an appropriate action. Actions are chosen based upon which danger profile was matched and what kind of user property 50 is being monitored. In step 716, the chosen action is executed by the security system 48.

A simple embodiment of the technique uses a single network transceiver 24 in a user property 50. The single transceiver 24 counts mobile devices 22 within range (and inside the user property 50). In such an embodiment, the network transceiver may alert a user that large numbers of mobile devices are present when perhaps they should not be. An example of such an occasion is in the rental property market. A property owner will rent out property and guests will come to stay in the property. In some cases, guests will invite a number of unauthorized individuals to enter the property (e.g., when throwing a party). Such circumstances can cause severe damage to the property. The damage may be physical or reputational (involving local law enforcement).

The effectiveness of tracking visitors depends largely on the visitors being unaware they are being tracked, or at the very least, unaware of the means employed to track them. The network transceiver 24 may be an unobtrusive black box with little to no markings in order to be inconspicuous. In some embodiments, the network transceiver 24 may connect to a local network (for communication to the application server 26) wirelessly in order to function while placed in a locked/hidden container, closet, or room.

FIG. 8 is a flowchart illustrating a method for visitor counting. In step 802, the network transceiver detects connection requests from mobile devices. This step proceeds similarly to the detection described in FIG. 2. The network requests may come over WiFi or other wireless networks (such as Bluetooth or cellular). In step 804, the network transceiver identifies unique device identifiers (such as a MAC address). In some embodiments, certain mobile devices will be ignored based on the unique identifier. In some embodiments, some devices with low RSSI values may also be ignored.

In embodiments where the purpose is to track mobile phones, MAC addresses associated with manufacturers that do not manufacture mobile phones are ignored. Further, some manufacturers use the MAC address schema to assign identifiers. In those cases, the scheme may be used to determine whether or not a device is a mobile phone. The network transceiver uses schema related to known devices in order to interpret the identifier data being transmitted by local mobile devices. An example where this is relevant is where a guest brings both a mobile phone and a laptop to a rental property. Rather than have that guest appear as "two" guests, the network transceiver may be programmed to ignore the laptop.

For these steps, it is unnecessary for the network transceiver to store or keep the identifiers. The most important element of the step is to identify a number of unique guest devices based on an identifier. In step 806, the network transceiver ignores device identifiers associated with resident devices. Resident devices are devices that are always or nearly always detected by the network transceiver. There are a number of ways to filter for resident devices. One such way is to record the resident devices into the programming of the network transceiver (this may be achieved through the use of user application software) in order to generate an IFF list. Another way is to determine that a given device (as identified by a unique identifier) is a resident device is if that device is detected at a certain frequency (e.g., eight or more hours a day for a week). A third manner of ignoring resident devices is for the user to merely know how many resident devices there are and alter a setting to reduce the total device count by that number.

In step 808, once devices are counted and resident devices have been filtered out of count, the network transceiver has an accurate count of guest devices. In step 810, the network transceiver transmits the guest count to the web server. In some embodiments, steps 808 and 810 are reversed. Rather, the wireless communicator transmits the device identifiers to the web server, and the web server generates the device count. To address device privacy concerns, the actual device identifiers may be hashed prior to transmission to the web server such that the web server never has the actual device identifiers. In some embodiments, only a portion of the device identifier (MAC address) is hashed. For example, the portion of the MAC address that identifies a manufacturer may be left unchanged, while the unique device ID is hashed to protect visitor privacy. The identity of the manufacturer may be used to determine whether or not a given device is a mobile phone or some other type of wireless device (e.g., a laptop computer). Where a given manufacturer markets both mobile phones and other devices, other criteria may determine device type. For example, where a device maintains the same signal strength (RSSI) for long periods of time, it suggests the device is not moving, and thus is unlikely to be a mobile phone.

In step 812, the web server compares the count of guest devices to a threshold set by a user application. In step 814, where the threshold is exceeded, the web server sends a notification to a user application on a user device. This notification may include push notifications within a registered web application or text messages. Other notifications may include a trigger for an "internet-of-things" device such as a security camera or a security system. There may also be more than one threshold. For example, there may be one threshold for too many people, and another for none. A reason for having a zero threshold is for the owner to know when a rental property has become empty in order to facilitate the scheduling of cleaning services.

Separate from the threshold, in step 816, the web server transmits the guest count to a user application on a user device. In step 816, the user application renders the guest count on the user device. In this way, the user (property owner) may always check in on the number of guests (or guest devices) on their property through a GUI on a user device.

Figure 9:
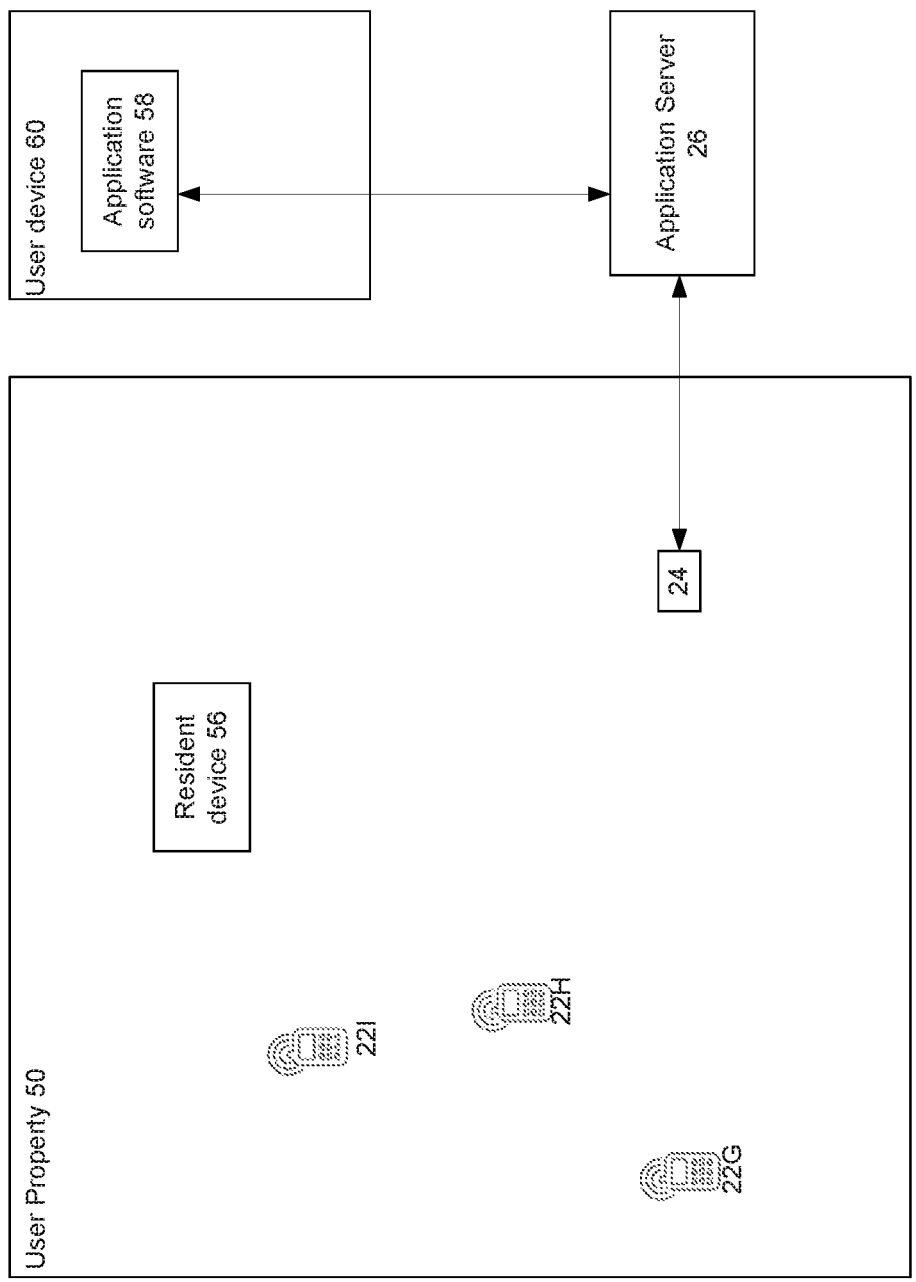
FIG. 9 is an illustration diagram of a visitor counting system in accordance with FIG. 8.

FIG. 9 is an illustration diagram of a visitor counting system in accordance with FIG. 8. The block diagram includes a user property 50 including a network transceiver 24. Depicted in the figure, the user property includes three mobile devices 22G-I and one resident device 56. The network transceiver 24 communicates with an application server 26. The application server 26 in turn communicates with a user's application software 58 on a user device 60.

The network transceiver 24 detects each of the three mobile devices 22G-I, as well as the resident device 56. The resident device 56 is ignored from the count that network transceiver 24 transmits and which eventually reaches the user device 60. Accordingly, the visitor count of FIG. 9 is three. There may be fewer or greater actual visitors at the user property 50, though "three" is an acceptable approximation. The application software 58 renders this count whenever requested by the user. The count is constantly updated as the network transceiver 24 informs the application server 26.

Where a threshold is established at "four," the addition of one more mobile device 22 will cause application server 26 to issue a notification to the application software 58 that the threshold has been exceeded. Conversely, if a threshold is established at "zero," when mobile devices 22G-I all leave the range of the network transceiver 24, and the network transceiver 24 informs the application server 26 of the new count, the application server 26 will transmit a notification to the user device 60.

In some embodiments, the user property 50 would include more than one network transceiver 24. Where the user property 50 is excessively large, such that the range of a single network transceiver 24 cannot service the entire user property 50, additional network transceivers 24 may be employed. In these embodiments, the network transceivers 24 add individually detected mobile devices 22 and filtering for unique device identifiers (e.g., MAC addresses) in order to determine a total visitor count.

Figure 10:
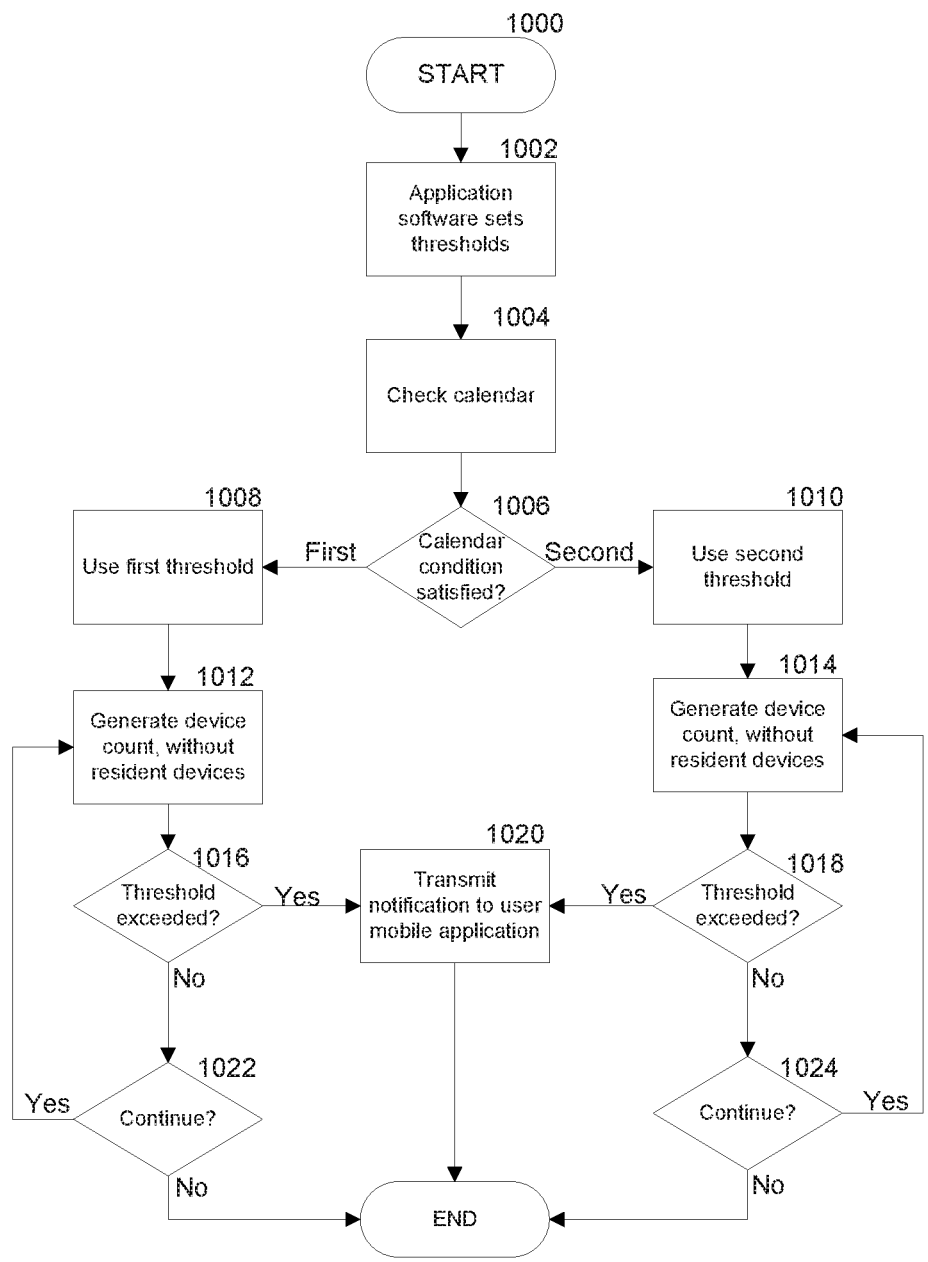
FIG. 10 is a flowchart illustrating a method for managing a visitor counting system with a calendar.

FIG. 10 is a flowchart illustrating a method for managing a visitor counting system with a calendar. As previously discussed, the technique disclosed herein may include the use of multiple thresholds. The application software can configure each threshold to be active at a time determined by additional user input. The additional user input may be the use of an export calendar or an API providing a direct interface between the application software and rental management software. In this manner, calendar events may be used to configure the use of each threshold.

In step 1002, the application software sets a number of thresholds via user interaction with a GUI. The user inputs settings and conditions as to where each threshold would apply. Examples of calendar-based conditions include guest checking in, guest checking out, maid service arriving, scheduled empty, scheduled for owner use, and other suitable calendar-based distinctions known in the art. In step 1004, the application server examines the user inputted calendar. As previously described, the calendar may come from an upload or a direct communications interface between the application server of the visitor counting technique and another application server.

In step 1006, the application server determines if a first or second calendar condition is satisfied. In step 1008, where the first calendar condition is satisfied, the application server employs a first threshold. In step 1010, where the second calendar condition is satisfied, the application server employs a second threshold. In steps 1012 and 1014, the network transceiver establishes a device count ignoring resident devices. The device count occurs regardless of the threshold employed. In steps 1016 and 1018, the application server checks each respective visitor count against the employed threshold. In step 1020, where the threshold is exceeded, the application server forwards a notification to the user device.

For example, a user may have an upcoming reservation of their rental property. The property can accommodate six people. The user sets a threshold for the reservation time of lower than approximately six (the user may want to accommodate for multiple devices). When that reservation time arrives, the application server begins using the determined threshold for the reservation (approximately six).

When the calendar has a scheduled check out day, a new threshold may be generated. At this point, the user is interested in scheduling a maid service. Thus, a threshold of less than one lets the user know when the guests have cleared out. In this manner, the user may then call the maid service to go and clean.

A third threshold may be established based on multiple conditions. Those conditions may be: (1) the calendar indicates a check out day and (2) the "less than 1" threshold has already been triggered that day. Using these two conditions, the application server may set up a third threshold for the cleaning staff (e.g., greater than 3). A fourth threshold may be similarly established, based on: (1) the calendar indicates a check out day and (2) the "cleaning staff" threshold has already been triggered that day, thus the application server establishes a fourth threshold for an empty property (e.g., greater than zero) that watches for burglars.

Figure 11:
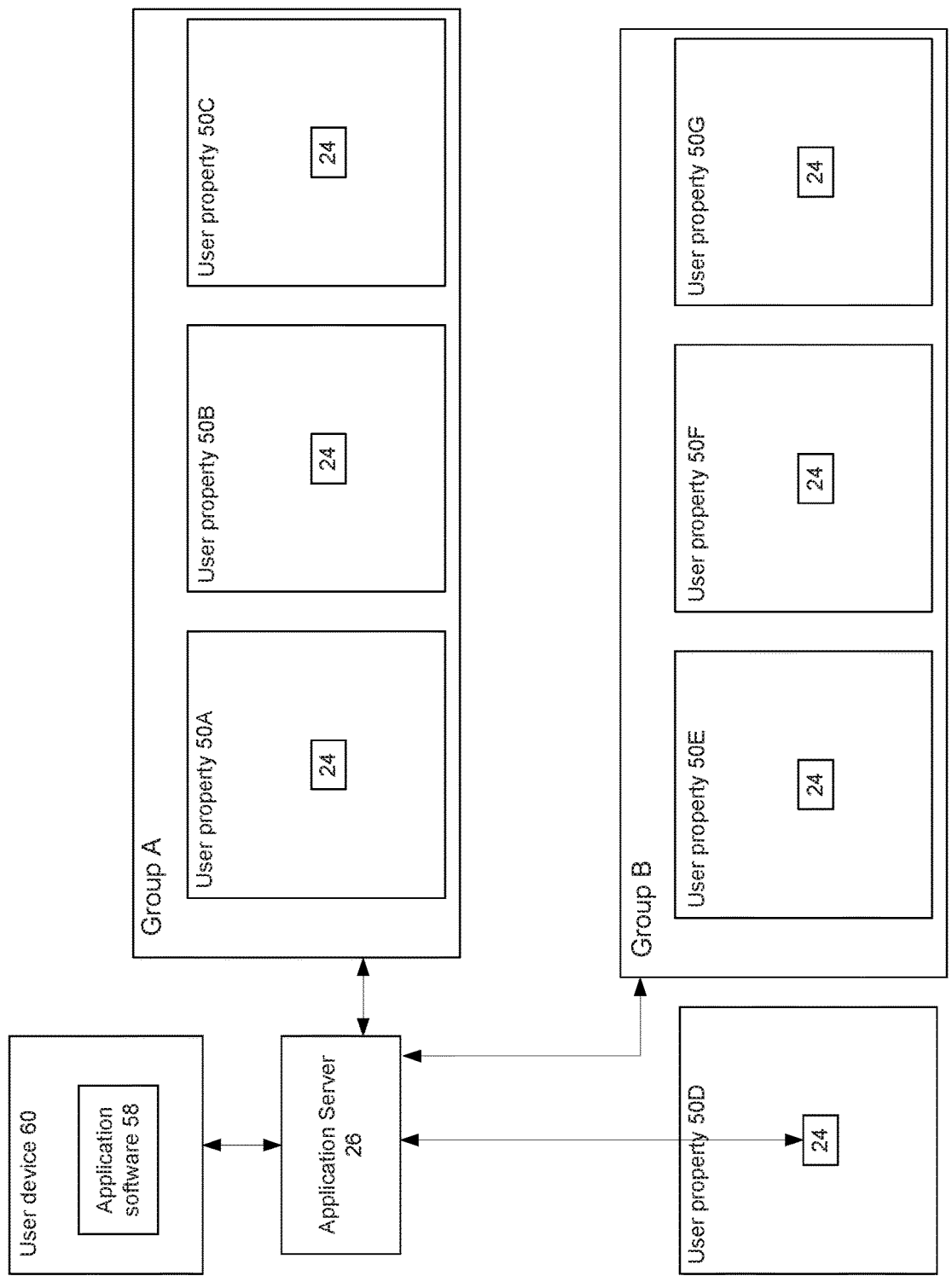
FIG. 11 is an illustration of a system for managing numerous properties with an integrated system of visitor counters.

FIG. 11 is an illustration of a system for managing numerous properties with an integrated system of visitor counters. Depicted in FIG. 11 are a number of user properties 50A-G. The user properties are divided into three groups: Group A, Group B, and user property 50D (positioned alone). In some embodiments, a user owns a number of rental properties. Adjusting thresholds for a number of properties can be onerous. Thus, the application software 58 may control settings and configurations for multiple user properties at once via the application server 26.

Figure 12:
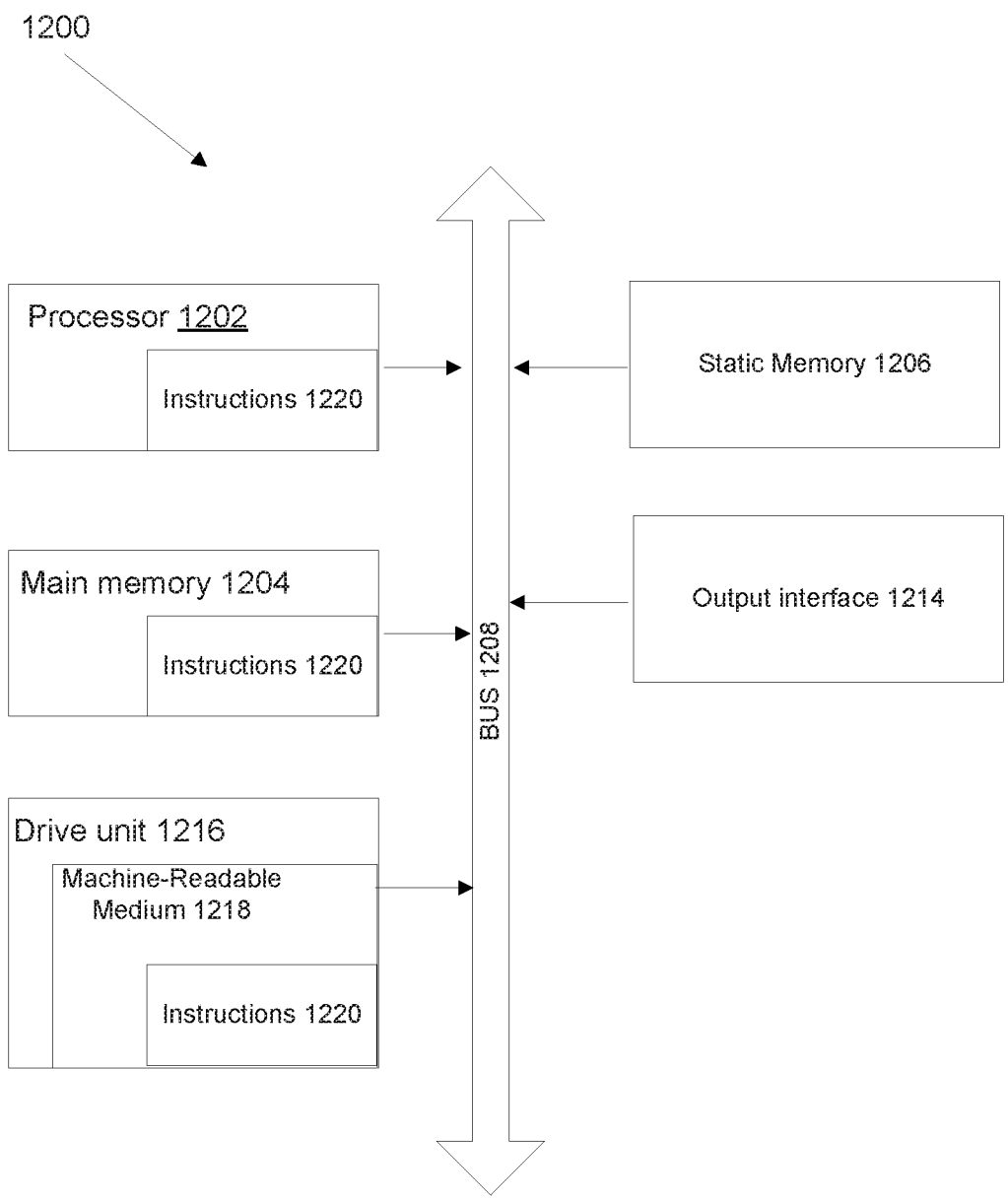
FIG. 12 is a block schematic diagram of a system in the exemplary form of a computer system within which a set of instructions for causing the system to perform any one of the foregoing methodologies and logical flows may be executed.

FIG. 12 is a block schematic diagram of a system in the exemplary form of a computer system 1200 within which a set of instructions for causing the system to perform any one of the foregoing methodologies and logical flows may be executed.

The computer system 1200 includes a processor 1202, a main memory 1204, and a static memory 1206, which communicate with each other via a bus 1208. The computer system 1200 also includes an output interface 1214; for example, a USB interface, a network interface, or electrical signal connections and/or contacts;

The disk drive unit 1216 includes a machine-readable medium 1218 upon which is stored a set of executable instructions, i.e., software 1220, embodying any one, or all, of the methodologies described herein. The software 1220 is also shown to reside, completely or at least partially, within the main memory 1204 and/or within the processor 1202. The software 1220 may further be transmitted or received over a network by means of a network interface device 1214.

In contrast to the system 1200 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g., a computer. For example, a machine-readable medium includes read-only memory (ROM); random access memory (RAM); magnetic disk storage media; optical storage media; flash memory devices; electrical, optical, acoustical or other form of propagated signals such as carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations (e.g., requiring cables and complex software configurations, or requiring a consultant to install). For example, embodiments may provide one or more cloud computing solutions that enable users, e.g., users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

Some of the subject matter described herein includes a method for detecting and engaging mobile devices, including determining, by a server, that a mobile device has connected with a wireless network to receive access to a first promotion corresponding to a physical location; providing, by a server, a captive portal of the wireless network to the mobile device, the captive portal providing a request for contact information corresponding to the mobile device; receiving, by the server, the contact information from the mobile device using the captive portal of the wireless network; and providing, by the server, a first message including information related to the first promotion to the mobile device in the physical location based on the contact information provided using the captive portal.

In some implementations, the method can include receiving, by the server, a first device identifier representing a unique identification of the mobile device, the device identifier received based on the mobile device scanning the wireless network; and associating, by the server, the contact information with the device identifier to represent that the mobile device was in the physical location.

In some implementations, the method can include receiving, by the server, a second device identifier representing the unique identification of the mobile device; determining, by the server, that the unique identification represented by the second device identifier is associated with the contact information; and providing, by the server, a second message related to a second promotion to the mobile device in the physical location based on the contact information, the first promotion and the second promotion being different.

In some implementations, the method can include determining, by the server, that the mobile device has left the physical location, the determination based on detecting that the unique identification of the mobile device is no longer detected; determining, by the server, that the first promotion was not effective; and providing, by the server, a second message related to the first promotion, the second message providing different information related to the first promotion than the first message.

In some implementations, the different information includes different terms related to the first promotion.

In some implementations, the unique identification corresponds to a media access control (MAC) address of the mobile device.

In some implementations, the method can include determining, by the server, one or both of characteristics of the mobile device or history of the mobile device in the physical location, wherein the information related to the first promotion is based on one or both of the characteristics of the mobile device or the history of the mobile device in the physical location.

Some of the subject matter described herein also includes an electronic device, including one or more processors; and memory storing instructions, wherein the processor is configured to execute the instructions such that the processor and memory are configured to determine that a mobile device has connected with a wireless network to receive access to a first promotion corresponding to a physical location; provide a captive portal of the wireless network to the mobile device, the captive portal providing a request for contact information corresponding to the mobile device; receive the contact information from the mobile device using the captive portal of the wireless network; and provide a first message including information related to the first promotion to the mobile device in the physical location based on the contact information provided using the captive portal.

In some implementations, the electronic device can receive a first device identifier representing a unique identification of the mobile device, the device identifier received based on the mobile device scanning the wireless network; and associate the contact information with the device identifier to represent that the mobile device was in the physical location.

In some implementations, the electronic device can receive a second device identifier representing the unique identification of the mobile device; determine that the unique identification represented by the second device identifier is associated with the contact information; and provide a second message related to a second promotion to the mobile device in the physical location based on the contact information, the first promotion and the second promotion being different.

In some implementations, the electronic device can determine that the mobile device has left the physical location, the determination based on detecting that the unique identification of the mobile device is no longer detected; determine that the first promotion was not effective; and provide a second message related to the first promotion, the second message providing different information related to the first promotion than the first message.

In some implementations, the different information includes different terms related to the first promotion.

In some implementations, the unique identification corresponds to a media access control (MAC) address of the mobile device.

In some implementations, the electronic device can determine one or both of characteristics of the mobile device or history of the mobile device in the physical location, wherein the information related to the first promotion is based on one or both of the characteristics of the mobile device or the history of the mobile device in the physical location.

Some of the subject matter described herein also includes a computer program product, including one or more non-transitory computer-readable media having computer program instructions stored therein, the computer program instructions being configured such that, when executed by one or more computing devices, the computer program instructions cause the one or more computing devices to determine that a mobile device has connected with a wireless network to receive access to a first promotion corresponding to a physical location; provide a captive portal of the wireless network to the mobile device, the captive portal providing a request for contact information corresponding to the mobile device; receive the contact information from the mobile device using the captive portal of the wireless network; and provide a first message including information related to the first promotion to the mobile device in the physical location based on the contact information provided using the captive portal.

In some implementations, the computer program instructions can cause the one or more computing devices to receive a first device identifier representing a unique identification of the mobile device, the device identifier received based on the mobile device scanning the wireless network; and associate the contact information with the device identifier to represent that the mobile device was in the physical location.

In some implementations, the computer program instructions can cause the one or more computing devices to receive a second device identifier representing the unique identification of the mobile device; determine that the unique identification represented by the second device identifier is associated with the contact information; and provide a second message related to a second promotion to the mobile device in the physical location based on the contact information, the first promotion and the second promotion being different.

In some implementations, the computer program instructions can cause the one or more computing devices to determine that the mobile device has left the physical location, the determination based on detecting that the unique identification of the mobile device is no longer detected; determine that the first promotion was not effective; and provide a second message related to the first promotion, the second message providing different information related to the first promotion than the first message.

In some implementations, the different information includes different terms related to the first promotion.

In some implementations, the computer program instructions can cause the one or more computing devices to determine one or both of characteristics of the mobile device or history of the mobile device in the physical location, wherein the information related to the first promotion is based on one or both of the characteristics of the mobile device or the history of the mobile device in the physical location.

In one example, a customer carrying a mobile device (e.g., a smartphone) can enter a retail store (or other physical location). The retail store can set up a sign advertising a promotion or sale, for example, a coupon is available to provide a discount on an item available for purchase. The sign can indicate that the coupon can be provided on the customer's mobile device if they connect to a particular wireless network (e.g., a wireless local area network (WLAN) based on one of the Institute of Electrical and Electronics Engineers (IEEE) 802.11 standards). If the customer connects to the wireless network, a captive portal (e.g., a landing page that can be provided and displayed on the mobile device upon connecting to a wireless network) can be provided in which the customer is prompted to enter contact information (e.g., a phone number) to receive the coupon via a messaging mechanism such as text messaging.

Additionally, since the customer's mobile device can connect to wireless networks, a device identifier uniquely identifying the mobile device (e.g., a media access control (MAC) address) can also be determined as the mobile device searches, or scans, for the available wireless networks including the one indicated on the advertisement and related to the promotion. The device identifier and contact information can be associated with each other so that the next time the customer enters the retail store with the smartphone, another promotion can be provided to the customer using the messaging mechanism because the device identifier can be identified as belonging to a mobile device that has already been at the retail store. As a result, the second promotion can be provided to the mobile device without the customer having to proactively decide to engage with the advertisement by selecting a wireless network again.

Information regarding the customer associated with the mobile device, for example, how often they visit the store, what promotions they were interested in, etc. can also be registered. As a result, some of the activities of customers at physical locations can be determined. Moreover, the customers can be engaged based on their activities. This can allow for improved customer experiences and allow for stores to determine more information regarding their customers.

Figure 13:
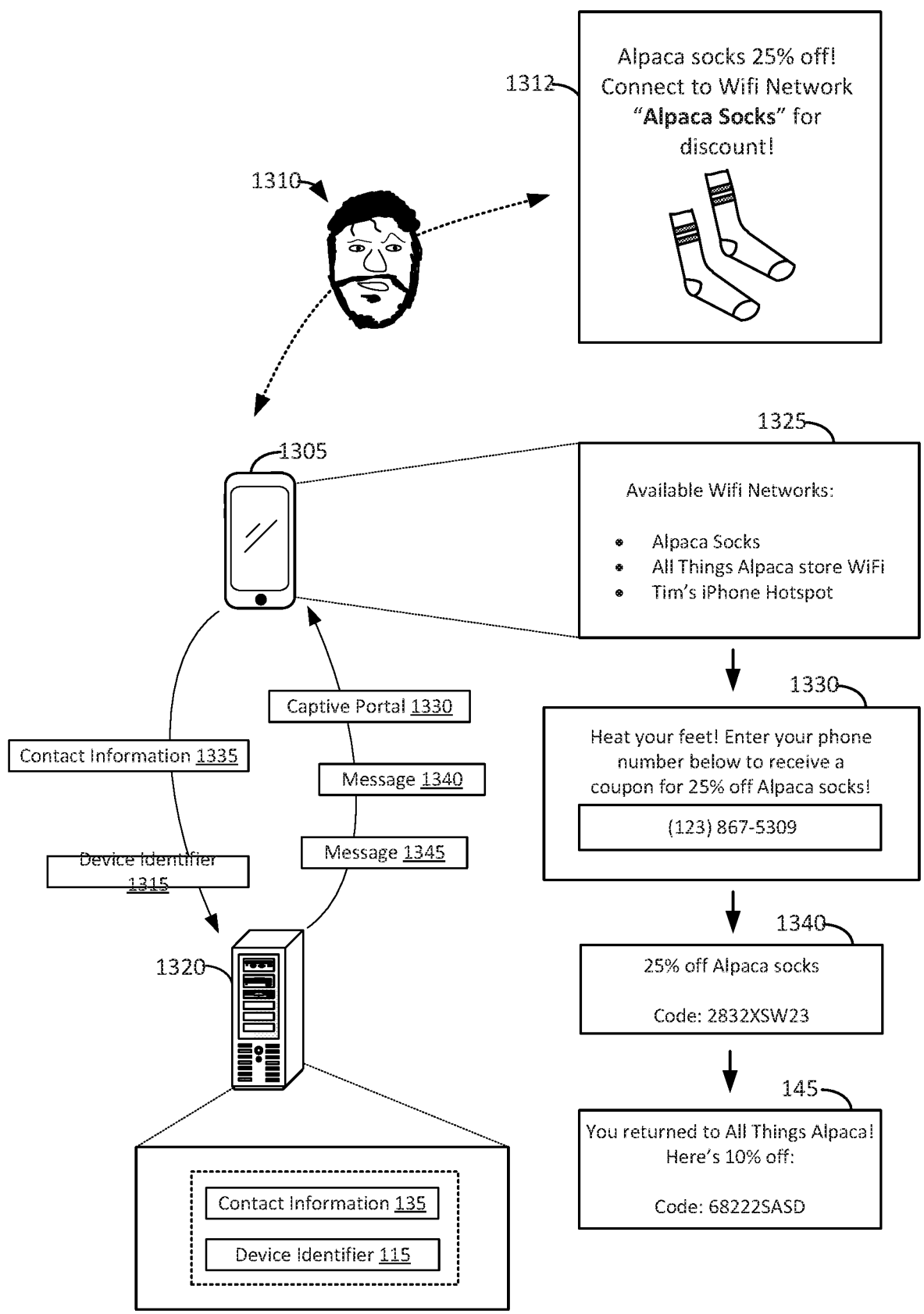
FIG. 13 illustrates an example of tracking and engaging a mobile device.

In more detail, FIG. 13 illustrates an example of tracking and engaging a mobile device. In FIG. 13, mobile device 1305 can be a smartphone, tablet, laptop computer, smartwatch, or other electronic device that customer 1310 has brought into a physical location or facility, such as a retail store. As customer 1310 wanders around the retail store, he may view sign 1312 indicating that the retail store is offering a promotion or sale (e.g., socks at 25% off) that is available if customer 1310 connects to a specific wireless network. For example, a WLAN can have a service set identifier (SSID) representing a name for the network that can be set up by the retail store.

Because customer 1310 is interested in the promotion, he can use smartphone 1305 to see the available wireless networks that it can connect to. As smartphone 1305 scans its environment to determine the available wireless networks, this exposes a device identifier of mobile device 1305. For example, mobile device 1305 can have a media access control (MAC) address that can serve as a unique identifier and assigned to its network interface controller (NIC). The MAC address can be determined by devices (e.g., network transceivers) of the wireless networks. Additional detail regarding this is detailed in U.S. patent application Ser. No. 15/006,057 entitled "Mobile Device Detection and Tracking," by Tenant de la Tour et al., and filed on Jan. 25, 2016, which was incorporated by reference in its entirety earlier herein. As a result, in FIG. 13, device identifier 1315 can be provided to server 1320. Server 1320 can be part of a system or network including components providing the wireless network. The components can be included within the retail store, outside of the retail store, or a combination of both. Server 1320 can then store this data to indicate that smartphone 1305 has visited the retail location at least once. Server 1320 can be one or more servers or other components, as discussed later.

As mobile device 1305 scans the available wireless networks, it can then provide a listing (e.g., of the SSIDs) of the wireless networks for customer 1310 to select one to connect with. In FIG. 13, this is portrayed with available wireless networks 1325 as provided on a user interface (UI) on a display screen of mobile device 1305. If customer 1310 selects the wireless network indicated in sign 1312 (e.g., the WLAN with the SSID mentioned on sign 1312), then captive portal 1330 can be provided by server 1320 to mobile device 1305. That is, by selecting the wireless network, this can provide an indication to server 1320 that mobile device 1305 has connected with the wireless network to receive access to the promotion mentioned in sign 1312 at the retail store, and therefore, captive portal 1330 should be provided.

A captive portal can be a "landing" or welcome page presented to mobile devices when connected to a wireless network that is configured to intercept data packets and prevent access to further resources or content other than the captive portal until some authentication, payment, acceptance of policy terms, etc. is performed using the captive portal. On some mobile devices, captive portal 1330 can be automatically displayed upon connecting with the wireless network. On other mobile devices, a notification can be provided that a captive portal is available to view. On some mobile devices, customer 1310 can launch a web browser and be forwarded to captive portal 1330. In FIG. 13, captive portal 1330 indicates that customer 1310 should use mobile device 1305 to provide his phone number to receive a coupon for the promotion (e.g., 25% off socks). When customer 1310 submits his phone number, this can be provided to server 1320 as contact information 1335. In some implementations, captive portal 1330 can be the only content accessible using the wireless network. That is, the wireless network set up for sign 1312 might not provide access to the Internet or other networks.

Server 1320 can associate contact information 1335 with device identifier 1315. That is, server 1320 can link contact information 1335 (e.g., a phone number) with device identifier 1315 (e.g., a MAC address uniquely identifying mobile device 1305). As discussed later herein, this can allow for server 1320 to identify when mobile device 1305 (presumably still operated by customer 1310) has entered the retail store later and provide another message (e.g., providing another promotional coupon) without customer 1310 having to select a wireless network, receive a captive portal, and provide a phone number. Rather, a message can be provided (e.g., via text messaging to the phone number corresponding to contact information 1335) without further interaction involving customer 1310 after the first-time contact information 1335 is provided and associated with device identifier 1315.

Server 1320 can provide message 1340 providing the promotion indicated in sign 1312 based on contact information 1335. For example, because contact information 1335 can provide the phone number of mobile device 1305, a text message can be generated by server 1320 and provided to mobile device 1305 (e.g., via a cellular network used by mobile device 1305). As depicted in FIG. 13, message 1340 can provide a code that customer 1310 can use (e.g., provide to a cashier, input into a self-check-out terminal, etc.), effectively being able to take advantage of the promotion indicated in sign 1312. However, in other implementations, message 1340 can include other content such as a hyperlink to a coupon available on the Internet, a bar code that can be scanned to provide the discount, an image, etc.

Customer 1310 can then purchase the discounted item and leave the retail store. Later, when customer 1310 returns to the retail store, mobile device 1305 can be scanning for available wireless networks again. Because this exposes a unique identifier (e.g., MAC address) of mobile device 1305 as previously discussed, device identifier 1315 can be provided to server 1320. Server 1320 can determine that it has previously received information regarding device identifier 1315, and therefore, customer 1310 is a returning customer to the retail store. Accordingly, contact information 1335 that is associated with device identifier 1315 can be looked up and a second message 1345 can be provided to mobile device 1305, for example, offering another promotional discount on another item. As a result, customer 1310 can be tracked and engaged in a physical location.

Figure 14A:
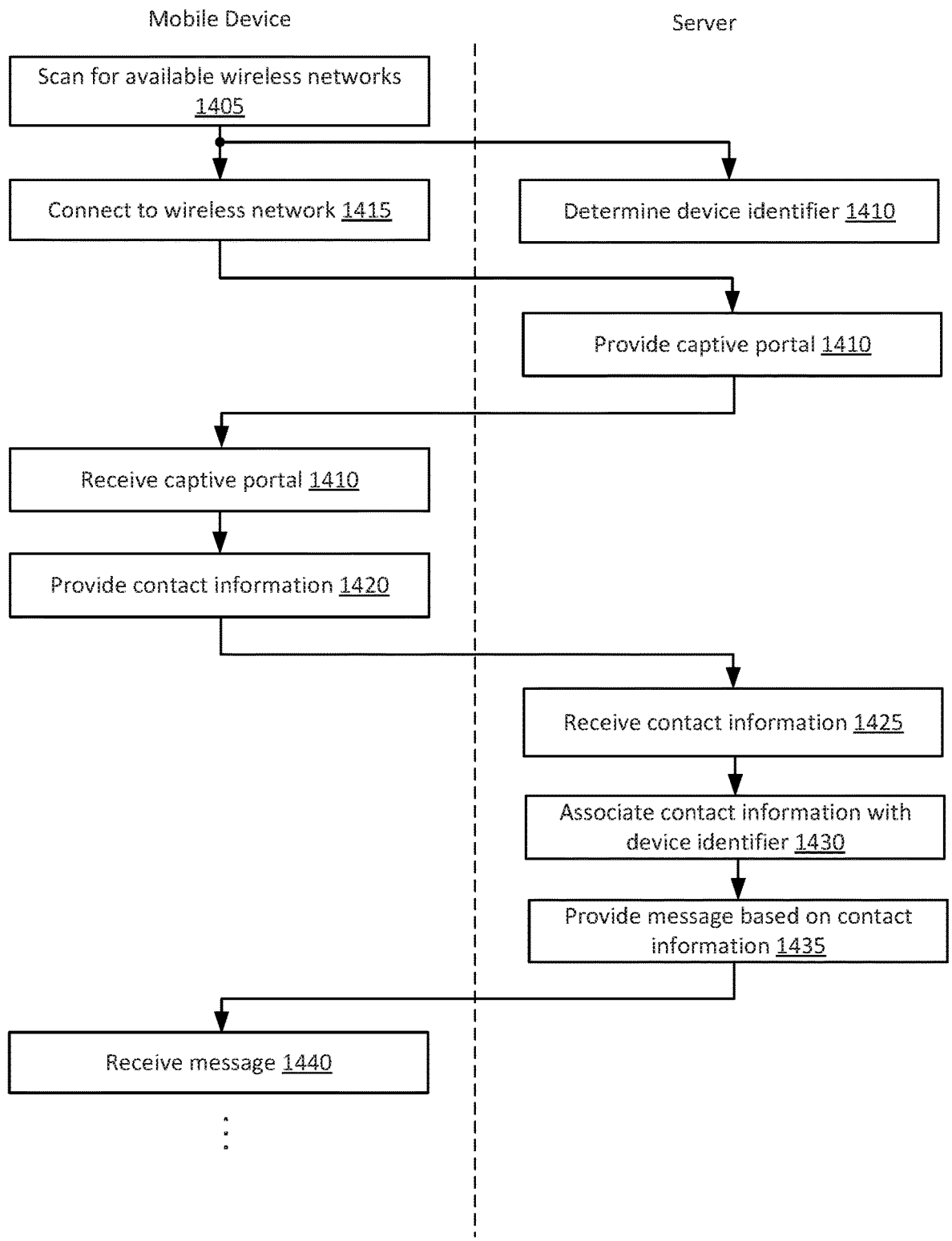
FIGS. 14A and 14B illustrate a block diagram for tracking and engaging a mobile device.
Figure 14B:
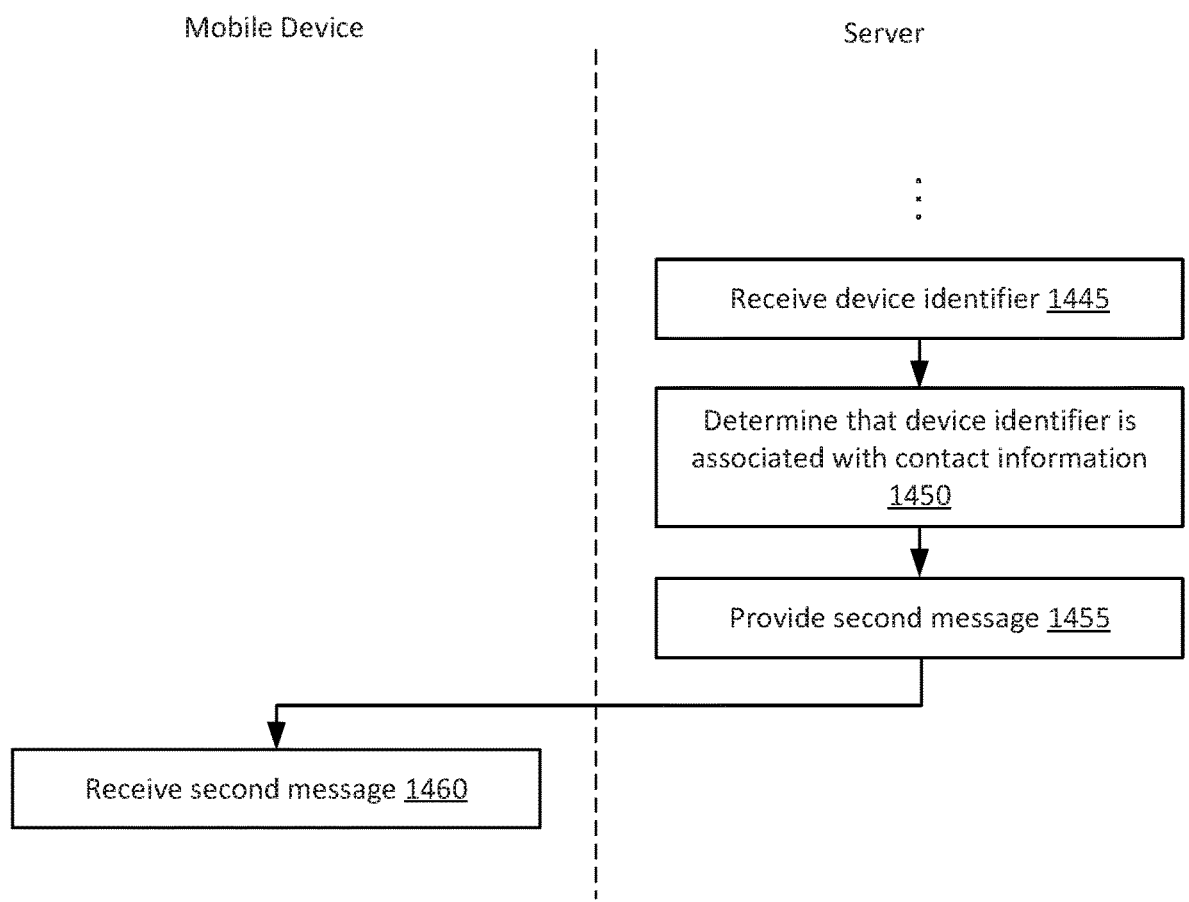

FIGS. 14A and 14B illustrate a block diagram for tracking and engaging a mobile device. In FIG. 14A, a customer can browse around a retail store with a mobile device. As the customer browses, the mobile device can scan for the available wireless networks in its environment (1405). This results in a server receiving or determining and storing a device identifier of the mobile device (1410). For example, in FIG. 13, mobile device 1305 can have a unique identifier such as a MAC address that is able to be captured as mobile device 1305 scans the available wireless networks. This unique identifier can be provided as device identifier 1315 to server 1320.

The customer can see an advertisement offering a discount on an item if they connect to a specific wireless network. For example, in FIG. 13, customer 1310 can see that sign 1312 is referring to a promotional discount on an item if he connects to a wireless network. As a result, the customer can use his mobile device to connect with the wireless network specified in the advertisement (1415). For example, in FIG. 13, customer 1310 can use mobile device 1305 to communicatively connect with the wireless network mentioned in sign 1312 and listed on available wireless networks 1325.

The mobile device can connect with the selected wireless network and a captive portal can be provided (1410). For example, in FIG. 13, captive portal 1330 can be provided by server 1320 to mobile device 1305. The mobile device can receive the captive portal (1410) and provide contact information using the captive portal (1420). For example, in FIG. 13, captive portal 1330 can indicate that a phone number should be provided to receive the promotional discount mentioned in sign 1312.

The server can receive the contact information (1425), associate the contact information with the previously received device identifier (1430), and provide a message based on the contact information (1435). For example, in FIG. 13, server 1320 can receive contact information 1335 and associate it with device identifier 1315, for example, stored in a database. Server 1320 can also provide message 1340 providing a promotional code allowing customer 1310 to engage in the promotion mentioned in sign 1312. The mobile device can receive the message (1440) and engage in the promotion. For example, customer 1310 in FIG. 13 can then purchase the item mentioned in sign 1312 at a discount using message 1340.

The customer can then leave the store with the mobile device. Later, the customer can return to the retail store with the mobile device. The mobile device can scan for available wireless networks and the server can receive the device identifier again (1445). For example, in FIG. 13, customer 1310 can return to the retail store with mobile device 1305 and device identifier 1315 can be provided again to server 1320. The server can determine that the device identifier is associated with contact information (1450). For example, in FIG. 13, device identifier 1315 and contact information 1335 can already be stored (e.g., in a database) and associated with each other by server 1320. This can indicate that customer 1310 is a repeat customer. Because server 1320 already has contact information 1335 for device identifier 1315, it can provide a second message to mobile device 1305 (1455). This can be done without providing a captive portal because server 1320 does not need to receive contact information 1335 again.

As a result, the mobile device can receive the second message (1460). For example, in FIG. 13, mobile device 1305 can receive message 1345 providing another promotional discount on another item.

Figure 15:
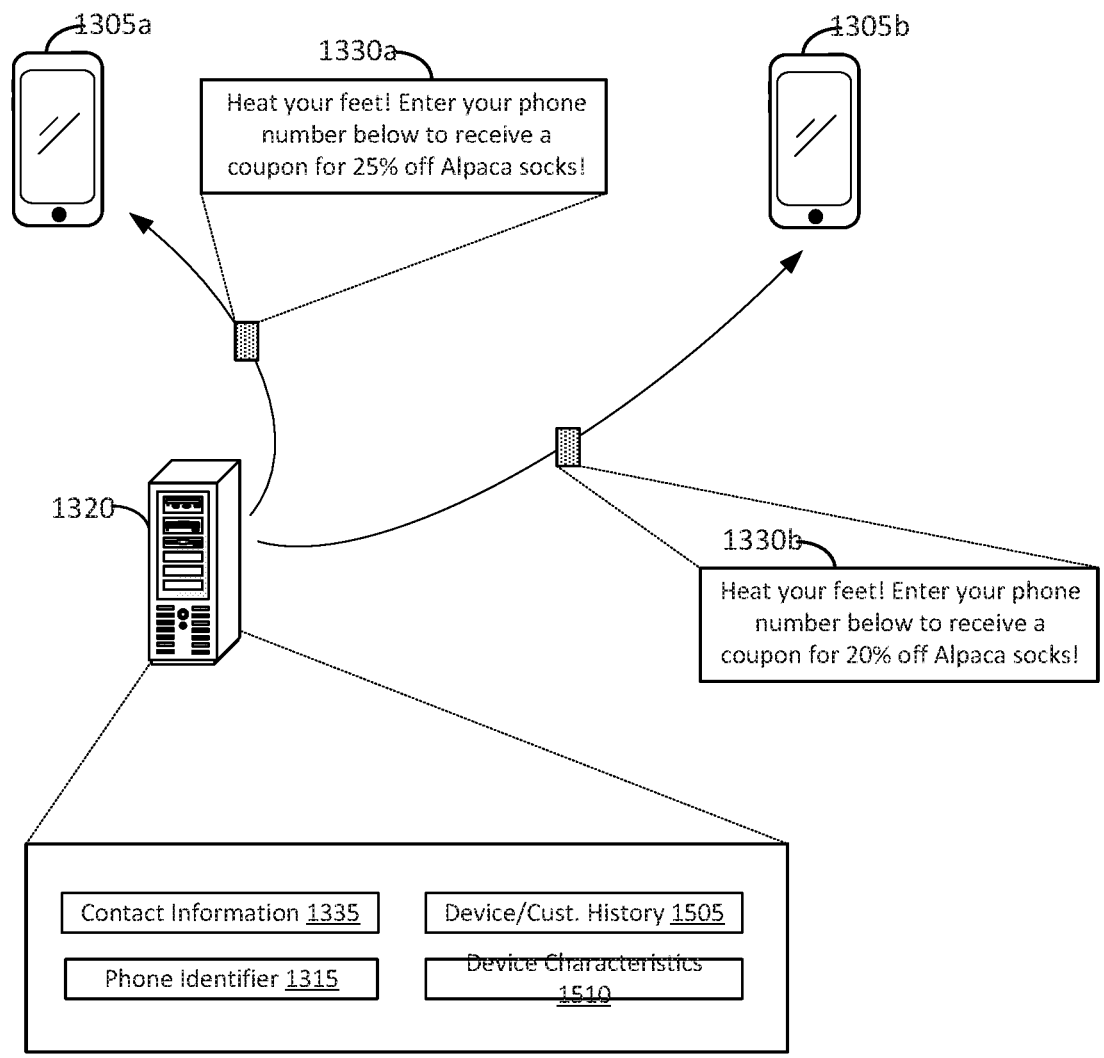
FIG. 15 illustrates an example of engaging two mobile devices differently based on history or mobile device characteristics.

Different captive portals and messages can be provided to mobile devices. FIG. 15 illustrates an example of engaging two mobile devices differently based on history or mobile device characteristics. For example, server 1320 can provide mobile devices 1305a and 1305b captive portals 1330a and 1330b, respectively, based on their characteristics and history. Captive portals 1330a and 1330b can include different content (e.g., offering different discounts of an item for purchase).

In FIG. 15, mobile device 1305a can belong to a new customer of a retail store. As a result, device identifier 1315 corresponding to mobile device 1305a can be determined by server 1320, as previously discussed. Additionally, server 1320 can determine characteristics of mobile device 1305a. For example, when device identifier 1315 is determined, some characteristics of mobile device 1305a can also be provided to server 1320. These characteristics can include a type of operating system (OS) used by mobile device 1305a (e.g., Apple iOS, Android, etc.), the version of the OS, etc. Information regarding the characteristics can be stored by server as device characteristics 1510. Additionally, device/customer history 1505 can also be stored. For example, the dates/times when the customer bringing mobile device 1305a into the retail store can be stored. Other types of information corresponding to activity of the customer or mobile device 1305a within the retail store can include what was purchased (e.g., by having server 1320 receive information regarding customer purchases), how often the customer goes to the retail store (e.g., the frequency of visits), the types of promotions they request to engage with, the type of customer (e.g., a customer categorized as a VIP), etc.

Based on device/customer history 1505 and mobile device characteristics 1510, server 1320 can select a particular captive portal to provide to mobile device 1305a when it connects with the wireless network. For example, in FIG. 15, captive portal 1330a indicates that a 25% discount on an item can be provided. If the customer uses mobile device 1305a to provide contact information 1335, then a message offering access to the discount can be provided, as previously discussed.

By contrast, mobile device 1305b can be provided captive portal 1330b rather than captive portal 1330a. Captive portal 1330b indicates that a 20% discount on the item can be provided. That is, captive portal 1330b offers different promotional terms than captive portal 1330a. This might be done if device/customer history 1505 and/or mobile device characteristics 1510 are different for mobile device 1305a and mobile device 1305b. For example, a customer associated with a mobile device that is more frequently detected within the retail store might receive better promotions than a less frequently detected mobile device to reward loyal customers.

The above example describes providing different captive portals to provide different information related to the promotion. However, in other implementations, the same captive portal can be provided, but different messages can be provided to mobile devices 1305a and 1305b based on device/customer history 1505 and/or mobile device characteristics 1510.

Figure 16:
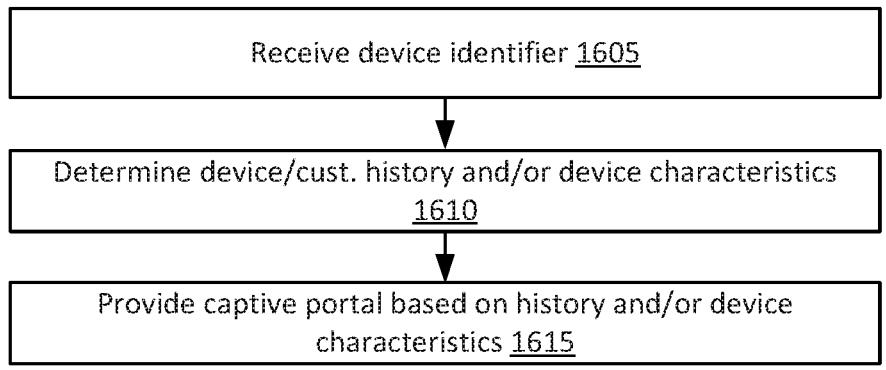
FIG. 16 illustrates a block diagram for engaging a mobile device based on history or mobile device characteristics.

FIG. 16 illustrates a block diagram for engaging a mobile device based on history or mobile device characteristics. In FIG. 16, a server can receive a device identifier of a mobile device (1605). For example, in FIG. 15, mobile device 105a can provide its device identifier to server 1320. Based on the device identifier, the server can determine the device/customer history, device characteristics, or both (1610). For example, in FIG. 15, device/customer history 1505 can include prior interactions of mobile device 1305a within the retail store, or even other retail stores (e.g., other retail stores of the same chain). Based on those, the server can provide a captive portal to the mobile device (1615). For example, in FIG. 15, captive portal 1330a can be provided to mobile device 1305a. If mobile device 1305b has different device/customer history, device characteristics, or both, then captive portal 1330b can be provided to it rather than captive portal 1330a.

Figure 18:
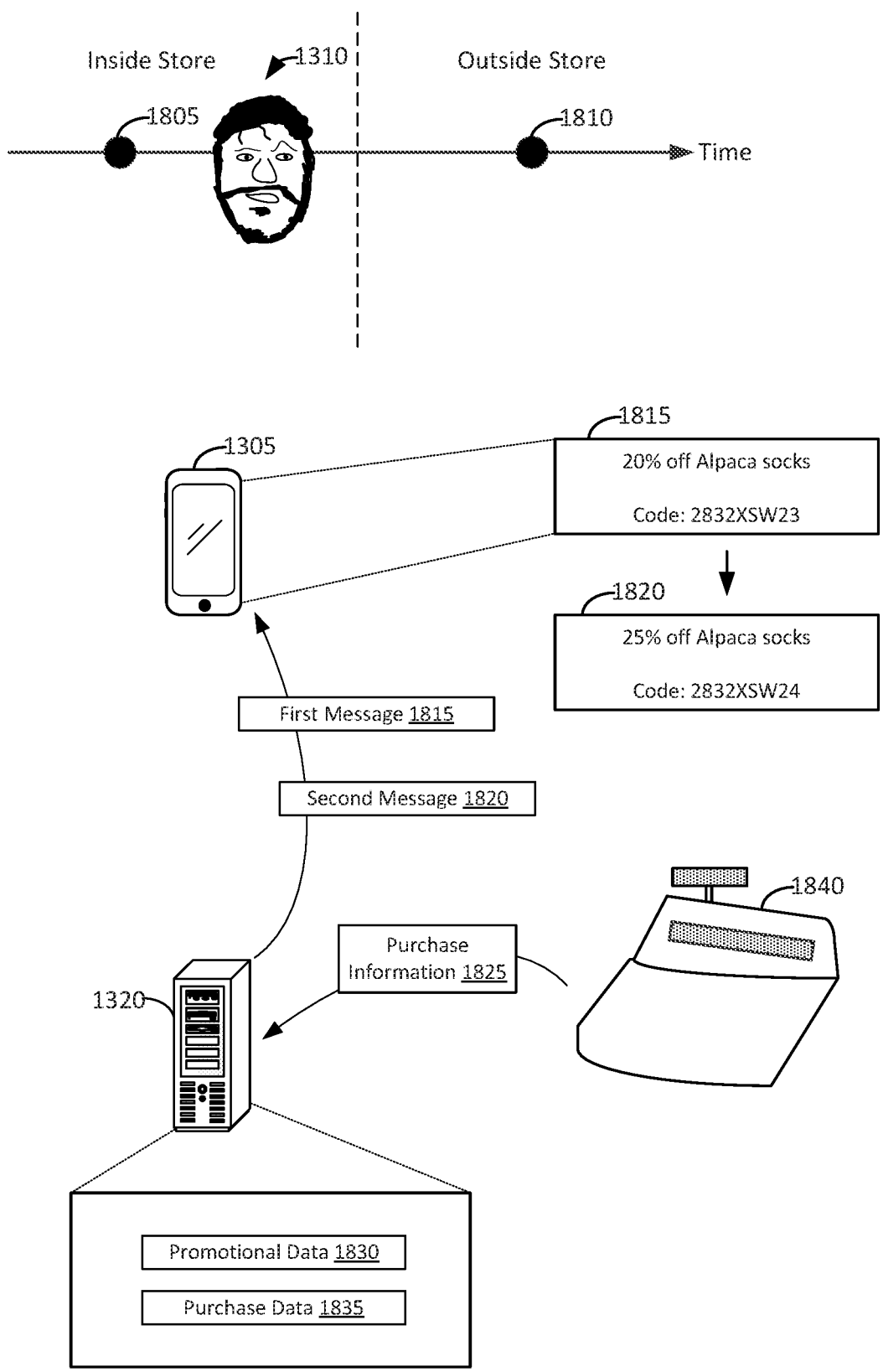
FIG. 18 illustrates an example of adjusting an engagement of a mobile device based on determining that a first engagement was not successful.

As discussed, a customer can bring a mobile device within a retail store and the presence of that mobile device can be detected based on its device identifier. A captive portal can be provided if the mobile device connects to a wireless network, and the contact information of the mobile device can be provided to receive a message providing access to a promotion. Later, the mobile device can receive messages without the use of the captive portal because its contact information and device identifier can be associated with each other. In some implementations, when the presence of the mobile device is no longer detected (e.g., the customer with the mobile device has left the store, and therefore the device identifier is no longer detected), then the promotional terms can be adjusted to entice the customer to return to make a purchase. FIG. 18 illustrates an example of adjusting an engagement of a mobile device based on determining that a first engagement was not successful.

In FIG. 18, at time 1805, customer 1310 can be inside a retail store with mobile device 1305. As a result, first message 1815 can be provided to mobile device 1305. Server 1320 can generate first message 1815 by determining the promotional details using promotional data 1830, which can include details regarding the promotions and messages that should be provided to mobile devices referencing the promotions. At time 1810, customer 1310 can leave the retail store with mobile device 1305 without making a purchase. That is, customer 1310 chose not to engage with the promotion provided by first message 1815. This results in the device identifier of mobile device 1305 no longer being detected (i.e., not scanned) because when it is outside of the store, the wireless network within the retail store cannot be detected by mobile device 1305, and therefore, its device identifier is not provided to server 1320. This can happen because the wireless network is not scanned by mobile device 1305 when it is out of range.

Server 1320 can then check whether a purchase was made by customer 1310 using mobile device 1305. For example, if customer 1310 checked out via checkout terminal 1840 (e.g., a cash register operated by an employee of the retail store) and purchased the item referenced in first message 1815, then purchase information 1825 can be generated by checkout terminal 1840 and provided to server 1320 indicating that a purchase was performed. This can be stored as purchase data 1835 by server 1320 in FIG. 18. If purchase data 1835 does not include a purchase of the item referenced in first message 1815 provided to mobile device 1305, then this can indicate that mobile device 1305 and customer 1310 did not engage in the promotion. Accordingly, server 1320 can generate second message 1820 offering different promotional terms to encourage customer 1310 to return to the retail store and make a purchase. For example, in FIG. 18, second message 1820 includes better promotional terms (e.g., 25% off in second message 1820 rather than 20% off as indicated in first message 1815).

Figure 17:
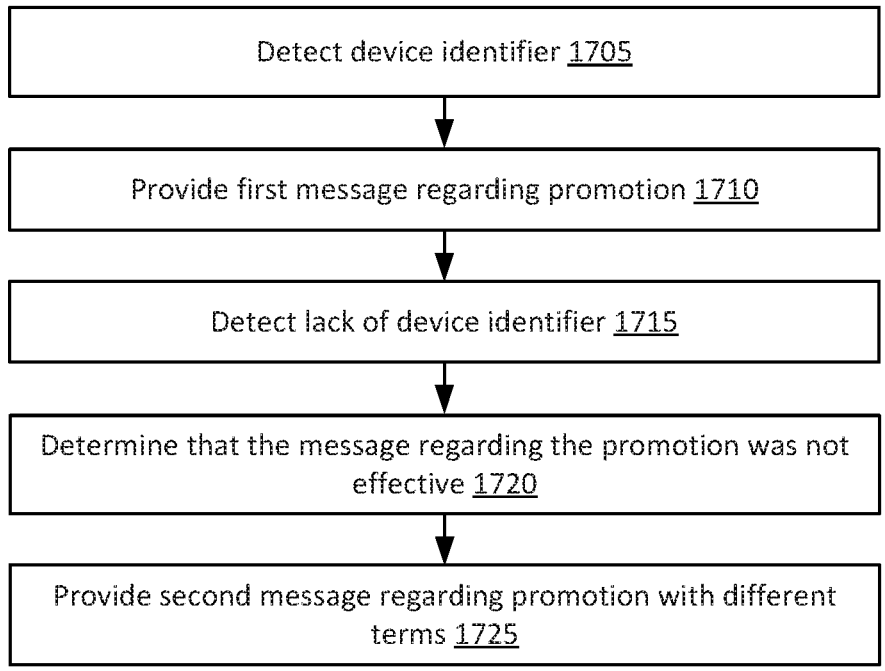
FIG. 17 illustrates a block diagram for adjusting an engagement of a mobile device based on determining that a first engagement was not successful.

FIG. 17 illustrates a block diagram for adjusting an engagement of a mobile device based on determining that a first engagement was not successful. In FIG. 16, a device identifier corresponding to a mobile device of a customer can be detected (1605). For example, in FIG. 17, the device identifier (e.g., MAC address) of mobile device 1305 can be detected when it scans for available wireless networks and that device identifier can be provided to server 1320. A first message regarding a promotion can then be provided to the mobile device (1710). For example, in FIG. 17, first message 1710 offering a promotion can be provided to mobile device 1305. If the mobile device leaves the retail store, then the lack of the device identifier can be detected (1715). For example, server 1320 might no longer be provided or detect the device identifier of mobile device 1305. In some implementations, not detecting or receiving the device identifier for a threshold time period (e.g., five minutes) might indicate that mobile device 1305, and therefore customer 1310, have left the retail store. As a result, it can be determined that the first message regarding the promotion was not effective (1720). For example, in FIG. 17, if customer 1310 using mobile device 1305 does not make a purchase including the item referenced in the promotion of first message 1710 and the device identifier is no longer detected, then first message 1710 can be considered to have been ineffective. A second message offering different promotional terms can then be provided to the mobile device (1725). For example, in FIG. 17, second message 1725 can be provided to mobile device 1305. The second message includes different promotional terms (e.g., a better or higher discount) than the first message provided when mobile device 1305 was detected to be within the retail store.

Many of the aforementioned examples discuss providing a message via text messaging to a phone number. However, in other examples, a message can be provided over other communication channels or mechanisms. For example, a mobile device can provide an email address for contact information and the message can be an email sent to the email address. Many of the aforementioned examples also discuss a wireless network that can be a WLAN (e.g., under one of the IEEE 802.11 standards). However, other types of wireless networks can be used. For example, a personal area network (PAN) such as Bluetooth® can also be used. Wireless cellular networks can also be used (e.g., 2G, 3G, 4G, Edge, H+, etc.). Many of the aforementioned examples also discuss a MAC address as a device identifier to uniquely identify devices. However, other types of device identifiers can also be used to uniquely identify devices.

Many of the examples herein discuss a retail store as a physical location. However, in other examples, the physical location can be a museum, restaurant, tourist attraction, amusement park, or other places.

Figure 19:
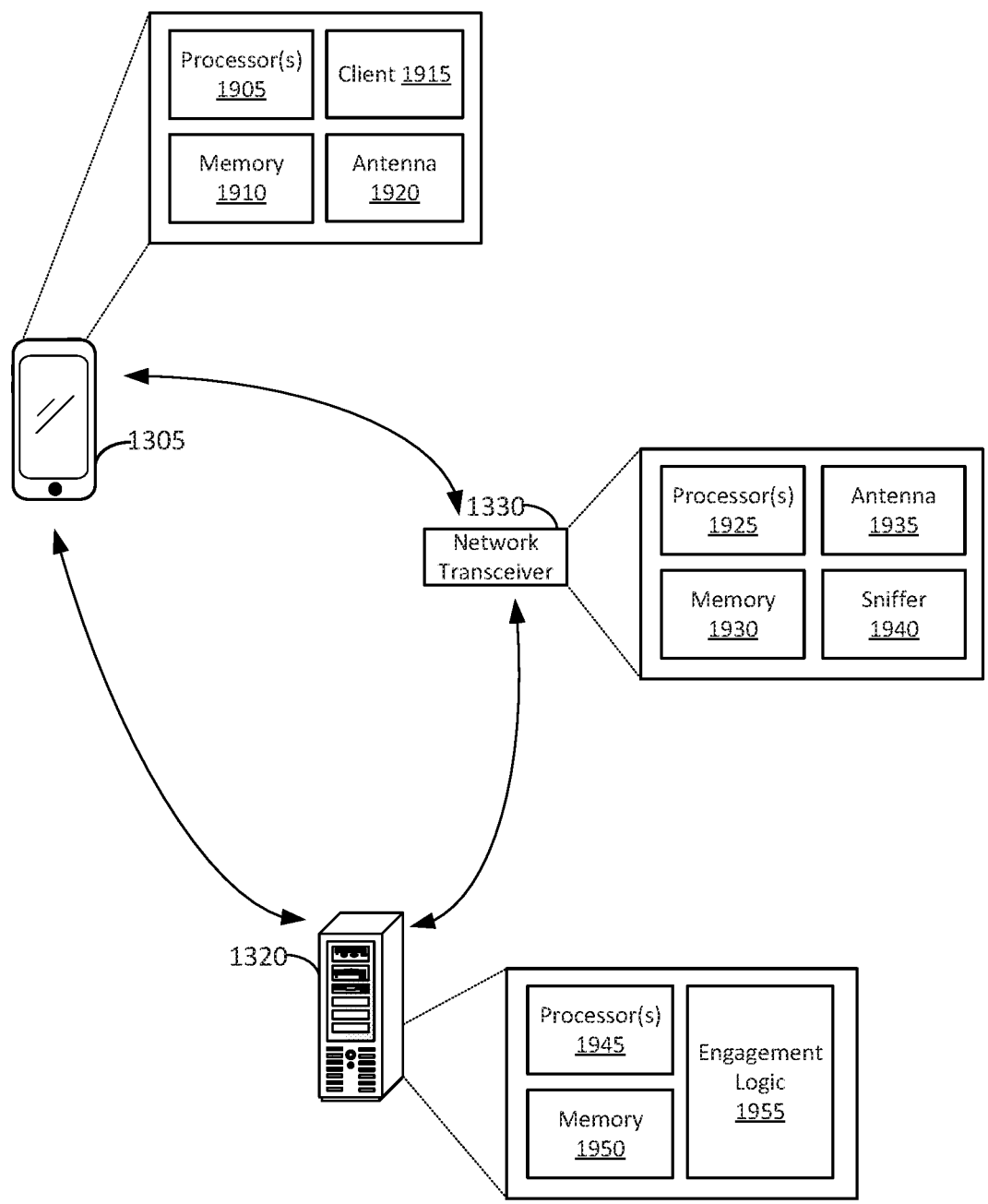
FIG. 19 illustrates an example of devices for tracking and engaging a mobile device.

FIG. 19 illustrates an example of devices for tracking and engaging a mobile device. In FIG. 19, mobile device 1305 can be an electronic device including one or more processors 1905 (e.g., circuits) and memory 1910 storing instructions that can be executed by processors 1905 to implement client 1915 providing the functionality of mobile device 1305 as described herein. For example, processors 1905 and memory 1910 can implement client 1915 to provide a user interface (UI) to select a wireless network, display messages, etc. as disclosed herein and also receive and provide data related to server 1320. Mobile device 1305 can also include one or more input/output (I/O) devices including a display screen, touch sensors, etc. Memory 1910 can be non-transitory computer-readable storage media. Mobile device 1305 can also include antenna 1920 to receive and transmit signals representing data wirelessly.

Network transceiver 1330 can be an electronic device including one or more processors 1925 (e.g., circuits), memory 1930, and antenna 1935 to implement sniffer 1940 as further discussed in U.S. patent application Ser. No. 15/006,057 entitled "Mobile Device Detection and Tracking," by Tenant de la Tour et al., and filed on Jan. 25, 2016, which was incorporated by reference in its entirety earlier herein. Accordingly, memory 1930 can be non-transitory computer-readable storage media storing instructions that can be executed by processors 1925 to provide functionality of sniffer 1940 and other functionality of network transceiver 1330, including providing a wireless network, receiving device identifiers (e.g., MAC addresses), etc. as disclosed herein.

Server 1320 can include one or more processors 1945 and memory 1950 to implement engagement logic 1955 to implement the features described regarding server 1320 herein. Accordingly, memory 1950 can be non-transitory computer-readable storage media storing instructions that can be executed by processors 1945 to provide functionality of server 1320 as disclosed herein.

In some implementations, network transceiver 1330 can be in the retail store with mobile device 1305 and server

1320 can be at a remote location. As a result, network transceiver 1330 can provide information to server 1320, such as the device identifier of mobile device 1305. In some implementations, server 1320 can be in the same location as network transceiver 1330. In some implementations, the functionality of network transceiver 1330 and server 130 can be integrated into a single device. In some implementations, server 1320 can be a distributed server including several computing systems.

Figure 20:
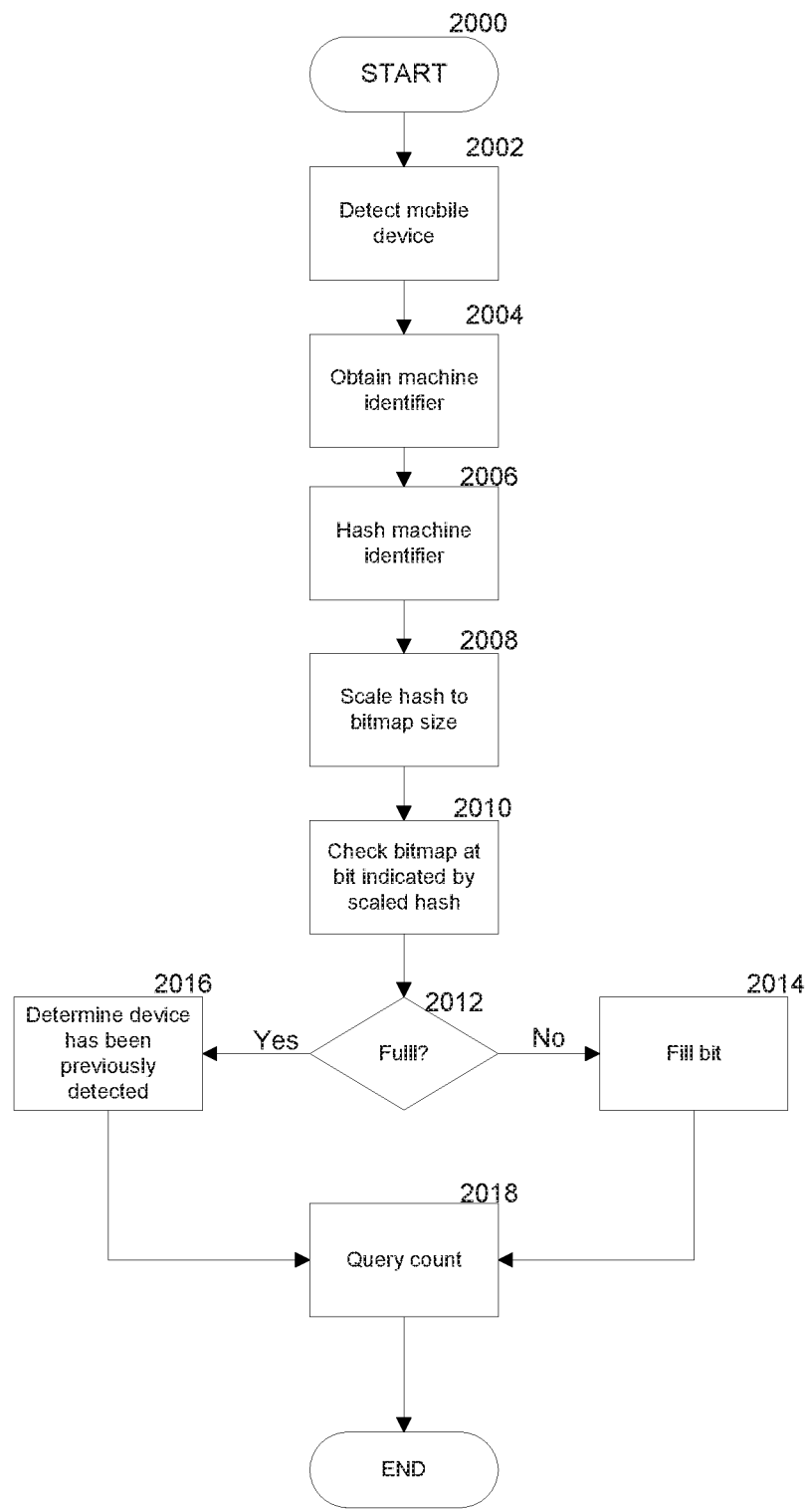
FIG. 20 is a flowchart illustrating a method of logging a mobile device.

FIG. 20 is a flowchart illustrating a method of logging a mobile device. Ultimately, the goal is to store the data of a MAC address (~6-8 bytes) with significantly less data, such as a single bit of data. In step 2002, a mobile device detection system detects a first mobile device. In step 2004, the detection system obtains the first mobile devices machine identifier. The machine identifier may be a MAC address, a SIM card identifier, or another suitable form of device identification known in the art.

In step 2006, the machine identifier is processed through a one-way hash function. The hash function is consistent such that for the same input, the hash function will always produce the same output. Further, the hash function produces output across a wide range. As with any hash function, the goal is to reduce the total number of possibilities of input to a smaller list of possible outputs. The input, a MAC address for example, has a high degree of complexity (~6-8 bytes). The output is less than that. The hash function thus accepts a degree of possible error (duplicates) in favor of speed/less memory usage.

In some embodiments the hash function treats different portions of a MAC address differently. For example, for MAC addresses with multiple parts, a vendor MAC and a device-specific MAC, the hash function may process the MAC in separate parts. In some cases, for popular mobile devices, the vendor MAC may be identical for many devices. Thus, in these embodiments, some vendor MACs are assigned a greater share of the range of output of the hash function. It's expected that the detection system will encounter many devices from the given vendor as opposed to another vendor. The less popular vendors are less likely to have collisions in data, so these vendors are given a smaller share of the potential output of the hash function.

In some embodiments, the hash function resolves the issue of having a popular vendor by generating highly varied output despite having similar input. This can be achieved by rearranging the characters of the MAC address (both portions vendor and device portions together) or using select characters from both the vendor MAC and the device MAC portions to create more varied combinations. Thus, even though the vendor MACs across many devices are very similar (or the same), the respective MACs would still have very different hashes.

In step 2008, the hash of the mobile device machine identifier is scaled to the bitmap used. The bitmap(s) used by a given detection system are sized based on the length of time a given bitmap is expected to operate and what expected traffic by the detection system is. A system expecting 100 people during a given period would have use a notably smaller bitmap than a detection system expecting 50,000 people in the same period. In some embodiments, expecting 100 devices can be supported by a bitmap including two to the 10-12th power of bits (~1 k-4 k of data). Thus, the scaling function scales the output of the hash function to a corresponding location in the used bitmap depending on the size of the bitmap.

In step 2010, the detection system checks the bitmap at the bit indicated by the scaled hash output. In step 2012, the detection system determines whether that bit is full (0 or 1). If the bit is empty, in step 2014, the detection system fills the bit, and the device is considered detected. If the bit is full, in step 2016, the detection system has seen that device before (since the previous clear of the bitmap) and this device has already been counted.

In step 2018, the detection system queries the count of devices. The query checks the relevant bitmap(s) and counts the number of full bits. The number of full bits is the number of devices in range of the detection system. Some device may fill the same bit, and thus there is a potential degree of error; however, this error is acceptable when generating estimates people counting.

Figure 21:
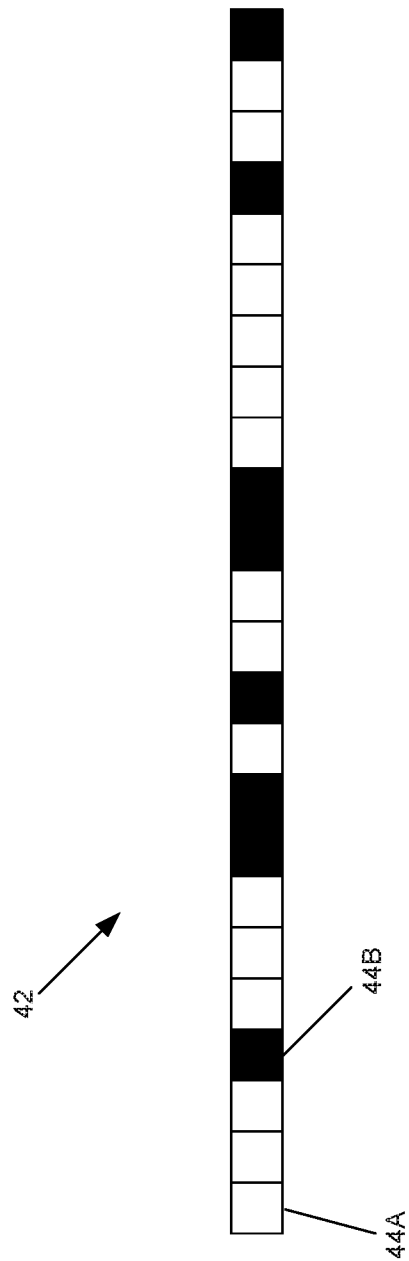
FIG. 21 is an illustration of a bitmap for storing mobile device identifiers.

FIG. 21 is an illustration of a bitmap 42 for storing mobile device identifiers. The bitmap is a binary data structure. In some embodiments, a single row bitmap 42 is used to store detection of particular devices. Devices are identified by a location designated by a one-way hash function (and in some embodiments, a scaling function) in the bitmap 42. In other embodiments, different configurations of bitmaps 42 (such as having multiple rows and columns) are usable as long as each has distinct locations, or bits. The figure includes both empty bits 44A and full bits 44B.

An empty bit 44A indicates that the corresponding device has not been detected since the last time the bitmap 42 was cleared. A full bit 44B indicates the corresponding device was detected since the previous bitmap clear. The size of the bitmap 42 varies based on the length of time the bitmap 42 is intended to operate for. As the intended operation time grows, so must the size of the bitmap 42. The bitmap 42 may be referenced for queries concerning particular bits, the number of full bits at any given time, and copy and clear functions. The bitmap 42 of FIG. 3 displays eight detected devices as represented by eight full bits 44B.

Figure 22:
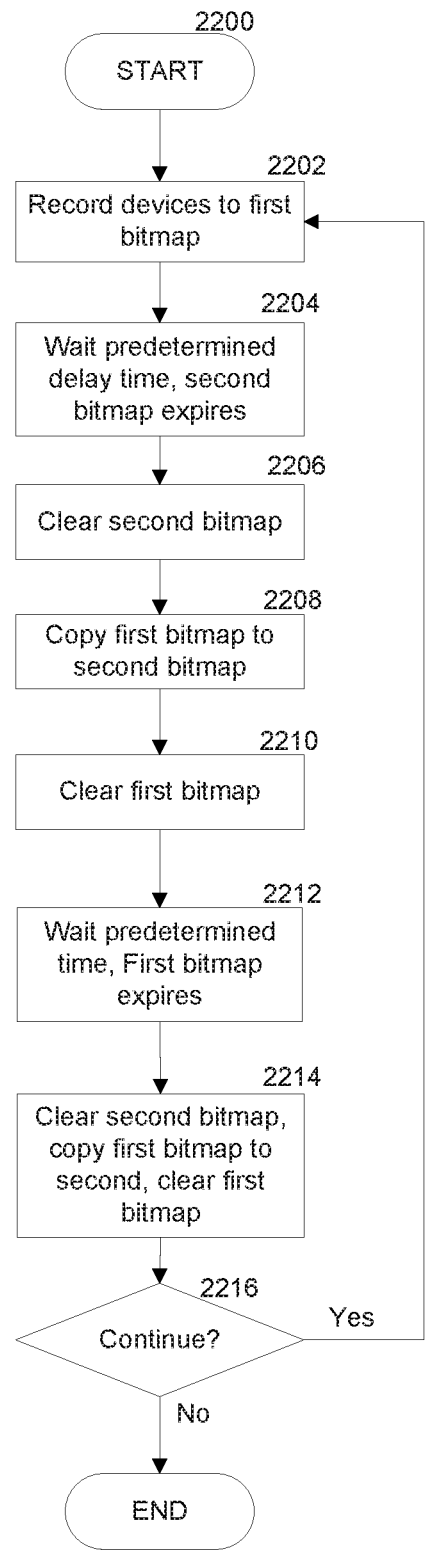
FIG. 22 is a flowchart illustrating a method of rolling bitmaps for consistent coverage.

FIG. 22 is a flowchart illustrating a method of rolling bitmaps for consistent coverage. If a given bitmap runs for long enough, every bit will be full, or the number of collisions will no longer be within an acceptable margin of error. Thus, the bitmap needs to be cleared every so often. However, clearing all data ruins the count as the bitmap is cleared. In order to resolve this issue, two or more bitmaps are used in a rolling fashion in order to determine the count.

In step 2202, a first bitmap is operated and filled as described in FIG. 20. Devices are detected, their machine identifiers are hashed and scaled to a bitmap, and then bits are filled as devices are detected. The bitmap may be queried for the count.

In step 2204, the detection system waits a predetermined delay time from the initializing of the first bitmap in order to begin a second bitmap. The second bitmap matches the first bitmap in size, thus any bits full on the first bitmap correspond to the same device on the second bitmap (within the margin of error). In step 2206, the second bitmap is cleared of bits (if any). In step 2208, the full bits of the first bitmap are copied to the second bitmap (via union function). In step 2210, the first bitmap is cleared. While the first bitmap is cleared, detected devices are continuously recorded to the first bitmap.

In step 2212, the detection system waits a predetermined delay time until the first bitmap expires. In step 2214, the second bitmap is cleared again, the first bitmap is copied into the second bitmap, and then the first bitmap is cleared (repeat steps 2206-2210). When a device is detected, the corresponding bit is filled (or recognized as full) in the first bitmap.

If the detection system continues to operate, then the method restarts from step 2202. In this manner, two bitmaps run simultaneously, though are staggered. In this manner, the count is never drops to zero suddenly (unless the count is actually zero) as one bitmap is cleared. The current data is queried from both of the bitmaps and added together.

In some embodiments, this method operates with additional bitmaps. Additional bitmaps (beyond two) enables the detection system to provide counts over a greater granularity of time. For three bitmaps, each might have a lifetime of 3.33 minutes. Thus, a given device would remain in the system for a minimum of 6.67 mins and maximum 10 min. The average time of accounting for a phone is 8.34 minutes (6.67+3.33/2). Therefore, the discrepancy is 1.67 minutes.

In this manner, the detection system can guarantee that a given user's information (or a hashed and scaled version of the information) is stored greater than the total lifespan of two bitmaps. Where there are only two bitmaps, the given user's information is stored for a maximum of one lifetime plus the interval between the two bitmaps. For example, if two bitmaps operate with a lifespan of 5 minutes, then the average length of time a user's information may be stored without their continued presence is 7.5 minutes. For three bitmaps the system is able to tell if a phone was seen within 0-3.3 min, 3.3-6.6 min or 6.7-10 min as opposed to just 0-5 and 5-10 min.

Other combinations of shared writes and clears of the rolling bitmaps are also suitable. For example, a clear of both bitmaps is not necessary after the expiration of each of the bitmaps. For example, the method functions if only the first bitmap is cleared when the first bitmap expires, and only the second bitmap is cleared when the second bitmap expires (e.g., skip step 2210, and the first portion of step 2214 that is corresponds to step 2206).

In some alternate embodiments, the process may additionally work where the two bitmaps alternate as the bitmap recording detected devices. The first bitmap records devices for half of its respective lifespan. Halfway through the lifespan of the first bitmap, the second bitmap becomes the recording bitmap. Counting is performed by comparing the full bits of both bitmaps. When any given bitmap expires, it is zeroed out and then takes over as the recording bitmap.

Figure 23:
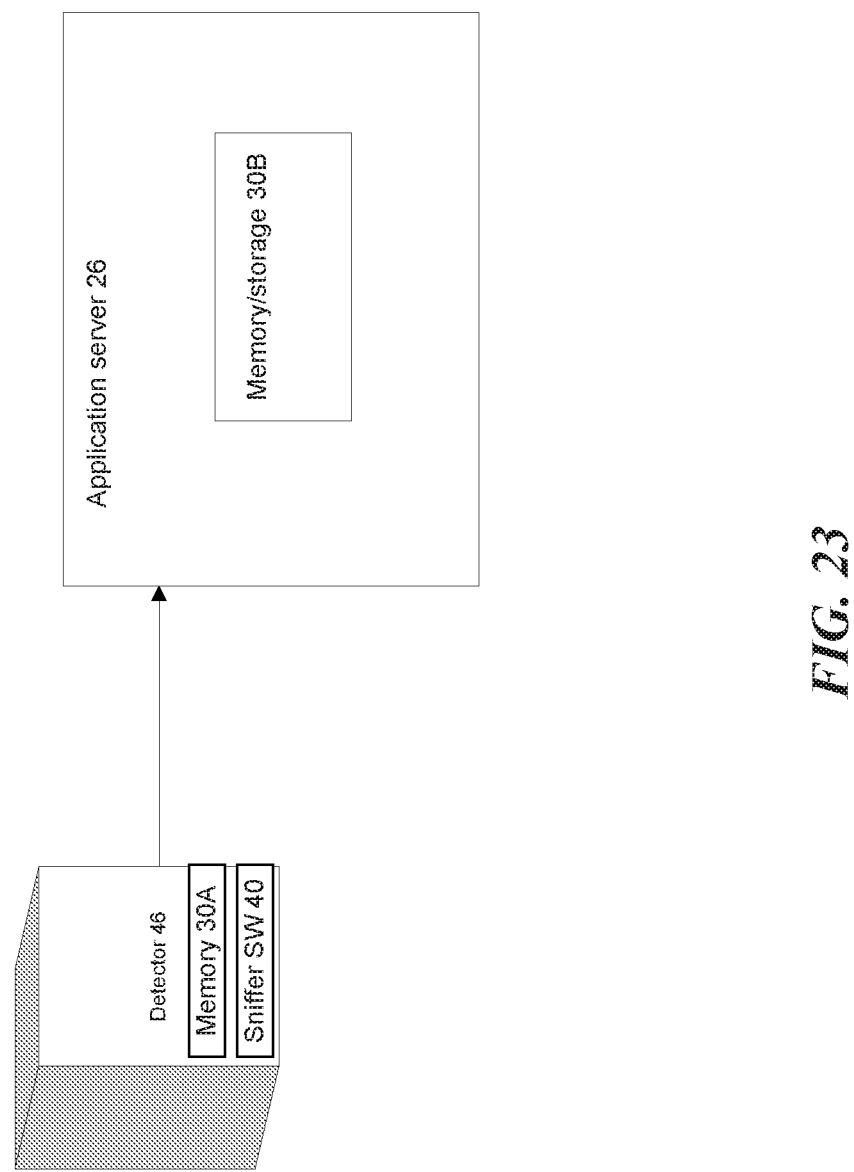
FIG. 23 is a block diagram illustrating data management between a detector and an application server.

FIG. 23 is a block diagram illustrating data management between a detector and an application server. Many people do not like having their personal identifying information (PII) stored with or without their knowledge. Thus, it is useful to build a system where a given device's machine identifier is never actually stored or recorded for any period.

In some embodiments, a device's machine identifier is never recorded or transmitted. When detected by an on-site detector device ("detector") 46, the detector 46 immediately hashes the machine identifier. In various embodiments, the bitmaps 40 are ultimately stored on the detectors 46 in a local memory 30A, or on the application server 26 in the server memory 30B. As a result that the bitmaps require such little storage space, they may be stored in the fastest forms of cache memory (thereby increasing the processing time). In some embodiments, storing the bitmap data in a hard disk or other long-term memory device is unnecessary and even inefficient.

Where the bitmaps are stored on the application server 26, the detectors 46 transmit the hashed identifiers to the application server 26. In these embodiments, the detector software may be very lightweight. The detector 46 only is required to include the detector software, the hashing algorithm, and network communication software. The counting and analytics may be executed on either the detector 46 or the application server 26. Where the counting is executed on the detector 46, the detector's output is merely the count of devices.

Figure 24:
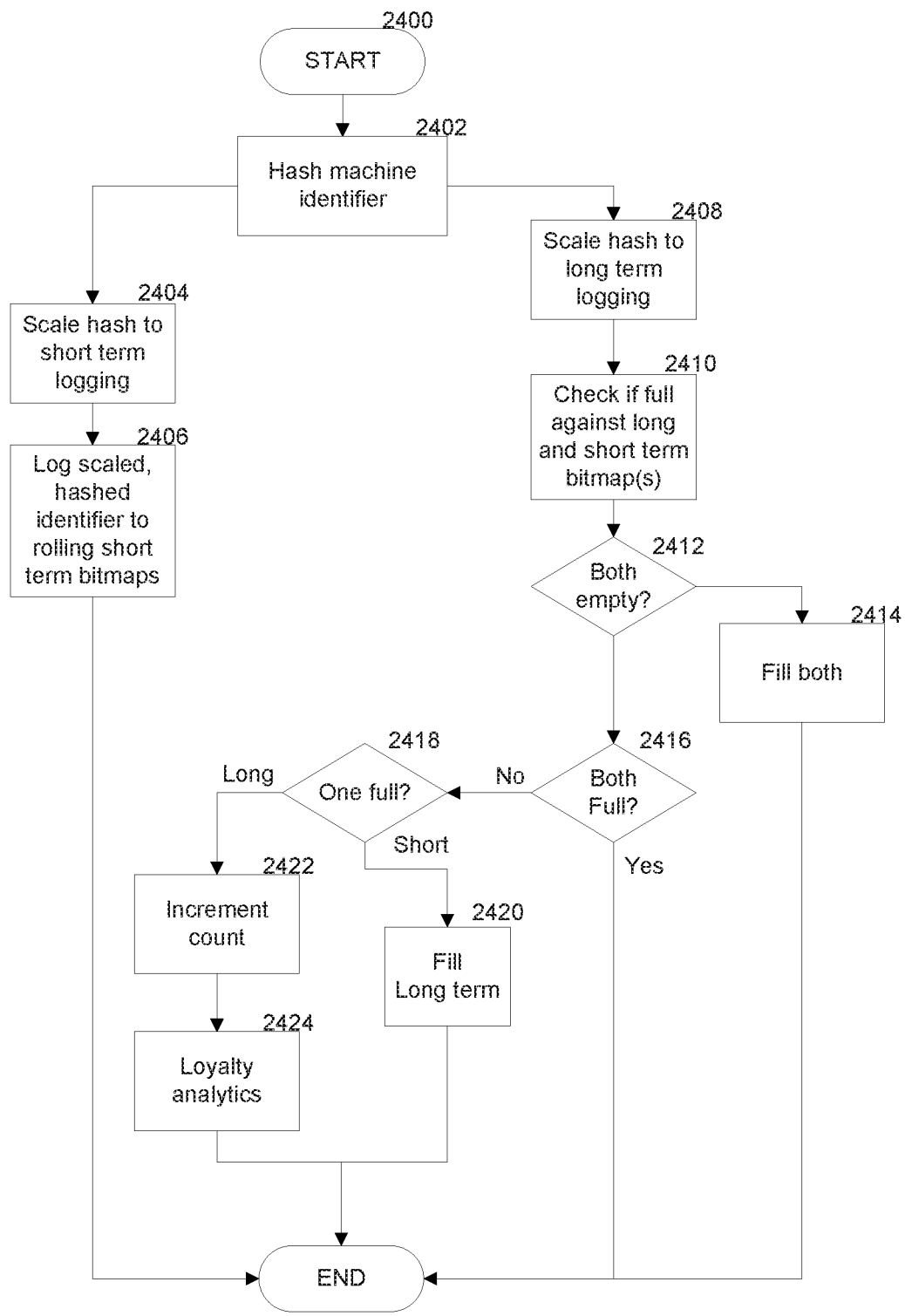
FIG. 24 is a flowchart illustrating a method of maintaining multiple bitmap tracking systems over variable time periods.

FIG. 24 is a flowchart illustrating a method of maintaining multiple bitmap tracking systems over varied lifespans. Thus far, bitmaps have been disclosed as each having the same lifespan. In some embodiments, bitmaps may have differing lifespans. Having varied lifespans adds additional functionality.

In step 2402, the machine identifier of a device is hashed. The same hash function is used regardless of bitmap size or lifespan. In step 2404, the hash is scaled to a short-term log (set of rolling bitmaps). In step 2406, a first set of rolling bitmaps operates as described in FIG. 4. The count is maintained over a lifespan of, for example, 10 minutes.

In step 2408, a second, the scaling function scales the hash to a longer-term log (bitmap or set of bitmaps). The longer-term bitmap(s) may have a lifespan of, for example, a month. Over the course of a given month, it is possible that the short-term bitmap would fill up entirely, or the margin of error would be exceeded. In some embodiments, the size of the bitmap scales to both the number of expected visitors, and the lifespan of the bitmap. Thus, the scaling function is different for the longer-term bitmap(s). However, in order to compare two bitmaps, they must be the same size, and thus use the same scaling function. Thus, in an embodiment where the short term and long-term bitmaps are compared, the scaling function of step 2404 and 2408 are the same.

In step 2410, the scaled and hashed machine identifier is checked against both the long-term and short-term bitmaps. In step 2412, the detection system determines whether the bit corresponding to that device is empty in both sets of bitmaps. If not, in step 2416, the detection system determines whether the bit corresponding to that device is full in both sets of bitmaps. Where the bit is full in both sets of bitmaps, no further action is taken. If both are not full, in step 2418, the detection system determines which of the two bitmap sets is full. If the bit is full in only the short-term bitmap, in step 2420 the corresponding bit is filled in the long-term bitmap set.

If the bit is full in only the long-term bitmap, in step 2422, a visit counter is incremented. The visit counter is another data structure separate from but corresponding to the bitmap. On a longer-term bitmap it is possible that a given visitor arrives, leaves, and then returns. In this manner, maintained presence in the location does not increment the counter at each detection (depending on detection rate of the detector, possibly multiple times a second). Rather, the counter is incremented when the short lifespan bitmap does not have record of the particular device. Thus, the device has at least been absent from the location for the short lifespan.

In step 2424, analytics may be run on the visit counters. The detection system is enabled to determine the average number of times a given user visits during the long-term bitmap's lifespan. This lets a given location determine whether the traffic experienced is largely repeat or new visitors.

Figure 25:
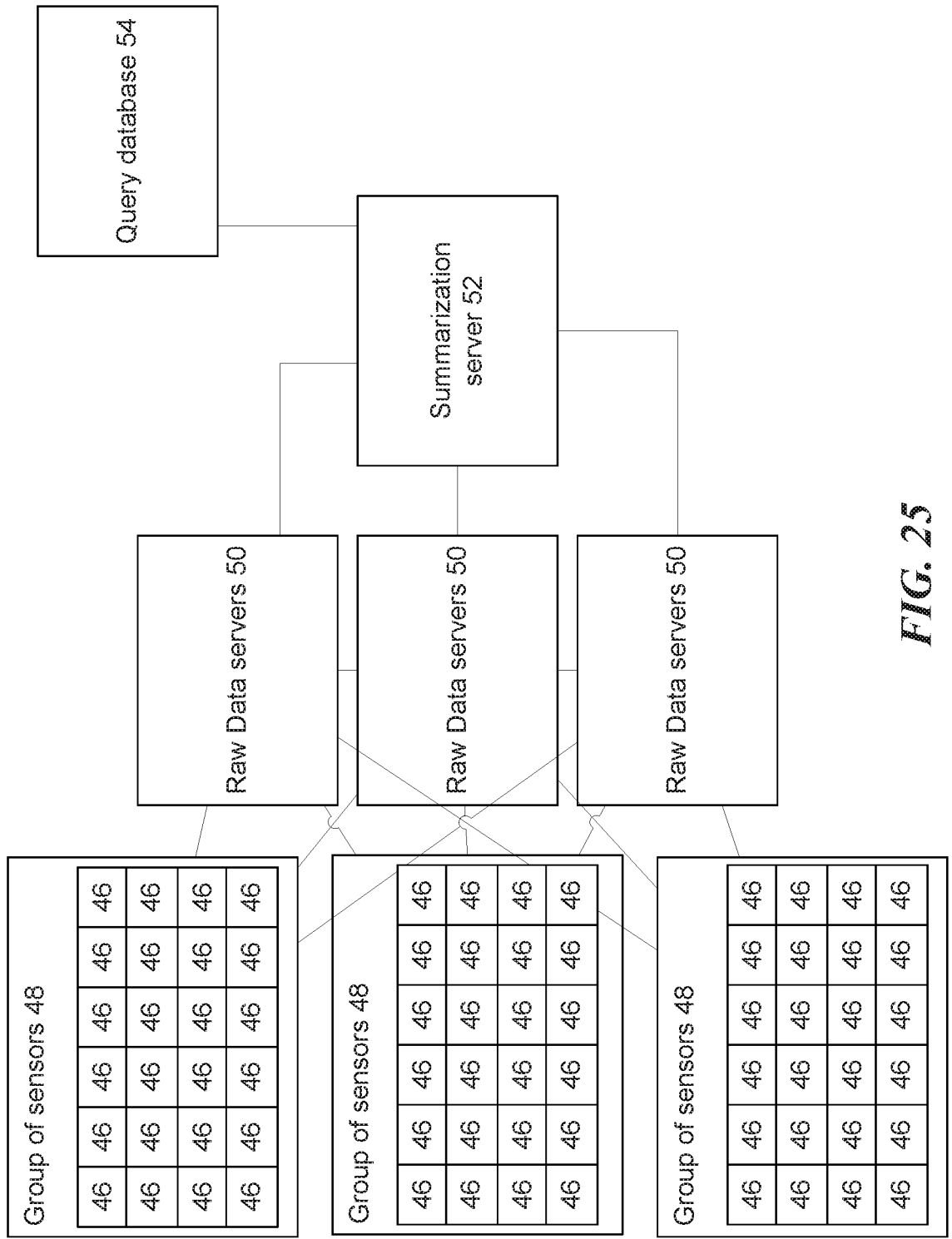
FIG. 25 is a block diagram illustrating a scaled network architecture.

FIG. 25 is a block diagram illustrating a scaled network architecture. At the bottom level, there are a number of individual people-counting sensors 46 sending raw data independently at intervals tagged with sensor IDs. The figure illustrates the sensors 46 as organized into groups of sensors 48. The groups of sensors 48 are determined based on the chosen deployment. For purposes of the figure, the particular grouping of sensors 46 is arbitrary. Considerations involved in the groupings for particular deployments include the sorts of structures people traffic is being monitored in, the geographic range and scope people are being monitored, and the ownership scheme of the sensors 46.

The raw data servers act as a store and forward persistent messaging bus that receives the raw data and batched (groups) based on sensor ID (e.g., point of origin). As data comes into the system at a high rate from many different, potentially geographically distributed locations it is important to aggregate and submit large batches to make the best of available bandwidth. The raw data servers 50 utilize a store and forward messaging system as a first line of defense against high volumes.

The raw data servers 50 make use of a distributed time-series database and are a distributed memory buffering mechanism that collects a stream of visits from a single sensor 46. A single sensor 46 writes sequentially to a single database location. Hence, the raw data servers 50 convert a random access write pattern into a much more efficient sequential write.

To simplify cross-origin aggregation (aggregation by groups of sensors 48) the raw data sensors write each origin in a group of sensors 48 to a "nearby" location. For example, the raw data servers write visits from a given sensor 46 into the same row of a relational database and the visits from the same group of sensors 48 into the same table. In other words, the primary key is origin and the secondary key (index) is the group. The raw data servers 50 store the raw data in a time series format, not a relational format. Hence, the raw data is easy to aggregate and range query by time (the high-level primary key is a timestamp). The raw data servers 50 purge records periodically. The purge may be based on a record lifespan, or a database clear. For example, records that are 24 hours old may be deleted, or an entire table may be cleared once every 24 hours.

The summarization servers 52 keep track of ongoing visits, and when the visits end (e.g., a given smart phone goes undetected for ~10 min). When a visit ends, that visit is written to a column store database on the summarization server 52. Visits are ingested into a persistent index structure optimized for summarization (based on sensor ID), in a time series database. In some embodiments, the ingest and the visit ends may be written to separate databases.

Periodically (e.g., every hour) the summarizations servers 52 batch and summarize the data. The summarization process reduces the available data fields of the raw data. For example, in some embodiments, the batching process reduces the raw data to merely a record of a given visit at a given sensor 46 with a timestamp. This significantly reduces the size of the data making the batched package of data significantly more scalable. The summaries may be enhanced to include data regarding the group of sensors 48, where each sensor 46 can be associated with a number of logical groups, and states can be computed with regards to each group of sensors 48. This additional data has a marginal effect on package size. One method to keep the data size down uses an origin identification scheme whereby a single ID designation denotes both an ID for an individual sensor 46, and the group of sensors 48 to which that sensor 46 belongs.

Periodically, at a rate independent from the batching process (e.g., daily), the query database 54 receives the summarized data packages form the summarization server 52 and writes the package into a relational structure database for reports and queries. Finally, the reports are computed live based on the summarized relational data and modified by mathematical approximations discussed further below.

At each layer of servers 50, 52, 54 progressively reduces the number of servers. The architecture transitions from many servers performing many writes and infrequent reads, to a small group of servers that perform infrequent writes (perhaps once daily) and many reads (prepared each time a user requests a report). In this manner, conflicting writes and reads are reduced and the network scales. At each level, a database structure is used that lends to the sort of raw data that is generated by people-counter sensors 46. The first layer uses a distributed time-series database and the top-level backend servers make use of a relational database.

Figure 26:
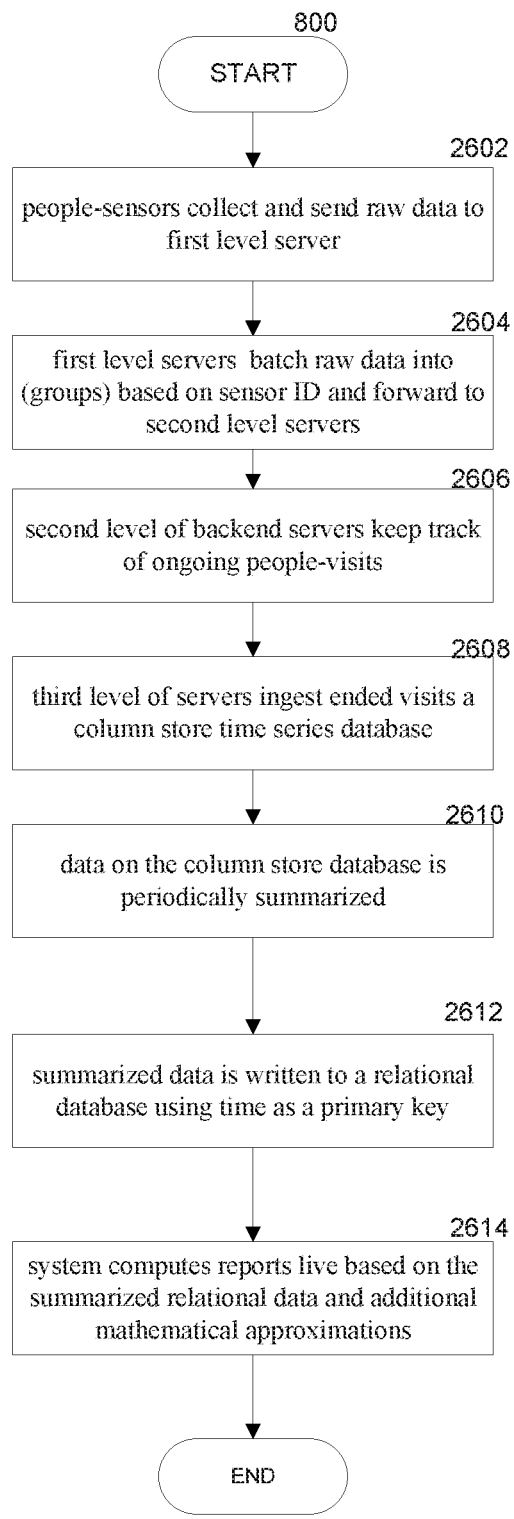
FIG. 26 is a flowchart depicting ingestion and processing of raw data.

FIG. 26 is a flowchart depicting ingestion and processing of raw data. In step 2602, a plurality of people-sensors collects and send raw data independently at fixed intervals tagged with a respective sensor id to a first level of backend servers. In step 2604, the first level of backend servers configured as store and forward persistent messaging buses receives the data and batched (groups) based on sensor ID. The data stored and forwarded by the first level of backend servers is made available to a second level of backend servers. In step 2606, the second level of backend servers keep track of ongoing people-visits (as determined by the raw data).

In step 2608, when visits end (e.g., no detection of device for ~10 min) the ended visit is written to the next level of backend server. The third level of backend servers ingest the ended visits into a persistent index structure optimized for summarization (based on sensor ID), in a time series database. The time-series database is a column store type database. In step 2610, the data on the column store database is periodically (e.g., every hour) summarized. Summarization includes counting the number of completed visits since the last summarization.

In step 2612, periodically, though at an independent interval (e.g., daily), the summarized data is written to a relational database using time as a primary key. In step 2614, the system computes report live based on the summarized relational data and additional mathematical approximations.

Relational data bases are good for reporting and can work on summarized data efficiently. However, they are not equipped to handle large volumes of raw data being ingested. Distributed column store databases, like Cassandra, are very resource hungry in small deployments, and do not aggregate time series data as efficiently. Using both styles of database (relational and column store) for respective tasks within the disclosed solution improves the overall scalability of the network and enables computationally inexpensive methods to ingest and report people-counting data.

The summarized data is the base data used to compute statistics, especially statistics over extended periods of time (greater than a day). In some embodiments, the window of processing the raw data is a calendar day. This is a result that the raw data requires significant disk space and is computationally expensive to query. For some expensive computations the system progressively timestamps a last processed visit to avoid recomputing the statistics across the same visits. Data is ingested in sorted order by location and visit end time to allow progressive processing. Ingesting in this fashion improves ease of aggregation for stats, such as the distribution of dwell times, where bucket counts can be added across arbitrary time ranges. In some embodiments, all the raw data is summarized into hourly and daily counts. For hourly summarization the network may merely provide the raw visitor counts.

Queries are made on the summarized data. This is comparatively less computationally expensive than querying the raw data, and further enables purging of the raw data periodically (as does not required continued use). Daily stats are in summarized and provided through an API that can be used in a reporting system to users. Furthermore, the network may cache the most recent dump of summary stats for clients that just want the most recent summary stats (as opposed to a report).

The queries are run on the recent summary dump or the hourly, daily summaries in the database for quick retrieval. In some embodiments, queries are limited to those with a time scale spanning a day or part of day of data. Other queries access a dump cache. This is because the data is shared daily. Queries on summarized data limited to a single day are computationally cheap. The queries aggregate over time and sum up aggregate stats from shorter time ranges. In some embodiments, the queries are run on both given sensors (point of origin) and/or groups of sensors (region of origin).

Figure 27:
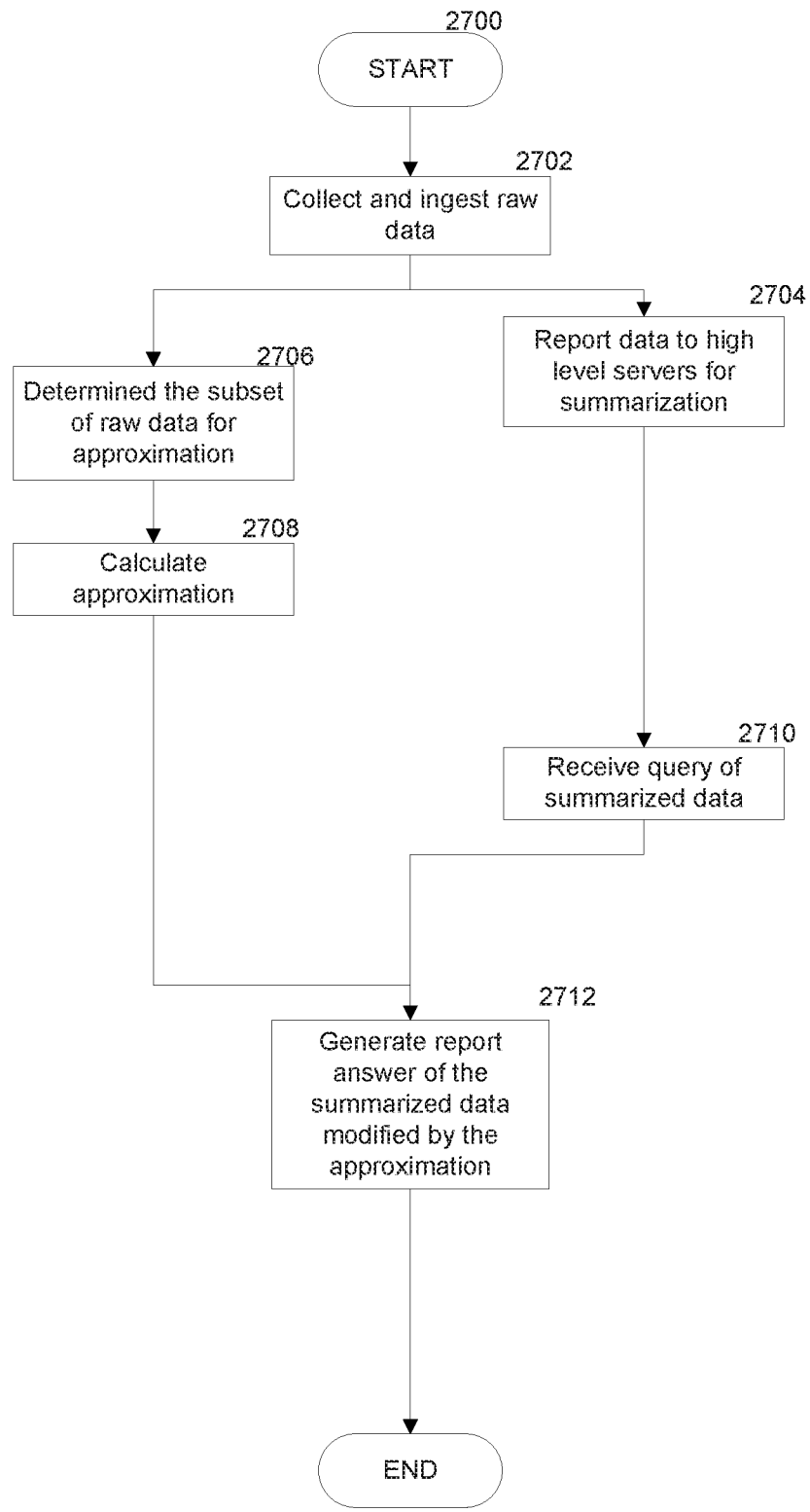
FIG. 27 is a flowchart depicting report generation involving summarized data modified by approximated statistics.

FIG. 27 is a flowchart depicting report generation involving summarized data modified by approximated statistics. Some statistics are difficult to scale. They either cannot be derived from summarized data or are very computationally expensive to run periodically. Thus, to generate this type of statistic, the system will approximate the statistic from the raw data, and then apply the approximation to the reports queried from the summarized data. The manner in which the approximation is used to modify the queried summarized data varies depending on the nature of the query on the summarized data.

In particular, these statistics are those that rely on movements of sensed visits and individual tracking of visit or device IDs. Thus, for two types of statistics: visit recurrence distribution and foot traffic vs car traffic ratios, the system uses approximations. The approximations are measurements and statistics to infer the derived metrics based on models of trained data. In some embodiments, training is performed periodically or for different major deployment types (depending on how the system is implemented and what use the system is being put to). The training uses the raw data, but only a subset of that raw data. Thus, the generation of an approximation is not as computationally expensive as generating a true statistic. Retraining periodically is not necessary if conditions don't change.

In step 2702, raw data is ingested. In step 2704 the raw data is reported to high level servers and databases and summarized. In step 2706, a subset of the raw data is determined based on the deployment style. In some embodiments an arbitrary subset of data is selected. In some deployments a representative subset of data is selected. To determine the subset of the raw data first a time range should be determined. The time range does not need to be linear (e.g., 15 minutes from three different points in a given day may be used).

A time range is to be representative of the population trends that reports are desired for. For example, if the deployment regards marketing in a chain of grocery stores, choosing a time when the stores are generally closed would not be representative. Further only examining a narrow portion of the day would not account for rush hours (e.g., visits after the majority of a population gets off work). Each deployment is unique, and a representative time is determined based on the unique factors that contribute to people-traffic in that deployment.

Similarly, the subset of raw data accounts for points of origin polled. The origin points used in the approximation are also representative. In some deployments, a single sensor is used to represent the raw data, in others multiple sensors or multiple groups of sensors are used. If the deployment is focused on traffic through a stadium, multiple sensors at one or more of the entrances are selected. These sensors may all be grouped together. In another deployment for a chain restaurant, a single sensor from a number of restaurants across multiple states may be selected. Once again, each deployment is unique, and a representative arrangement of sensors is determined based on the unique factors that contribute to people-traffic and geography in that deployment.

In step 2708, the approximation is calculated from the subset of the raw data. The approximation returns a percentage of the total that fits a certain visitor class. In step 2710, that percentage is applied to the summarized data based on a report query to generate a report.

In step 2710, the system receives a query of the summarized data. The query may specify a number of visitors of a particular class over a time period. In step 2712 the system generates a report that includes the total visitor population from the summarized data as modified by the approximation to determine the number of visitors in the queried visitor class.

For example, a given report queries the number of pedestrians who have passed through a given point of origin (sensor detection radius) over a particular time period. To execute the query, the summarized data is queried for the total visits over the specified time period (e.g., 10,000). Then, the approximation of the percentage of pedestrians to automobiles (e.g., 60% pedestrians) is applied to that total number. The return to the query is then the total visitors modified by the approximation (e.g., 6,000). The query of the relational database is computationally inexpensive because the data is relatively simple, and sorted only by primary key, whereas the modification by the approximation is a single computation.

Figure 28:
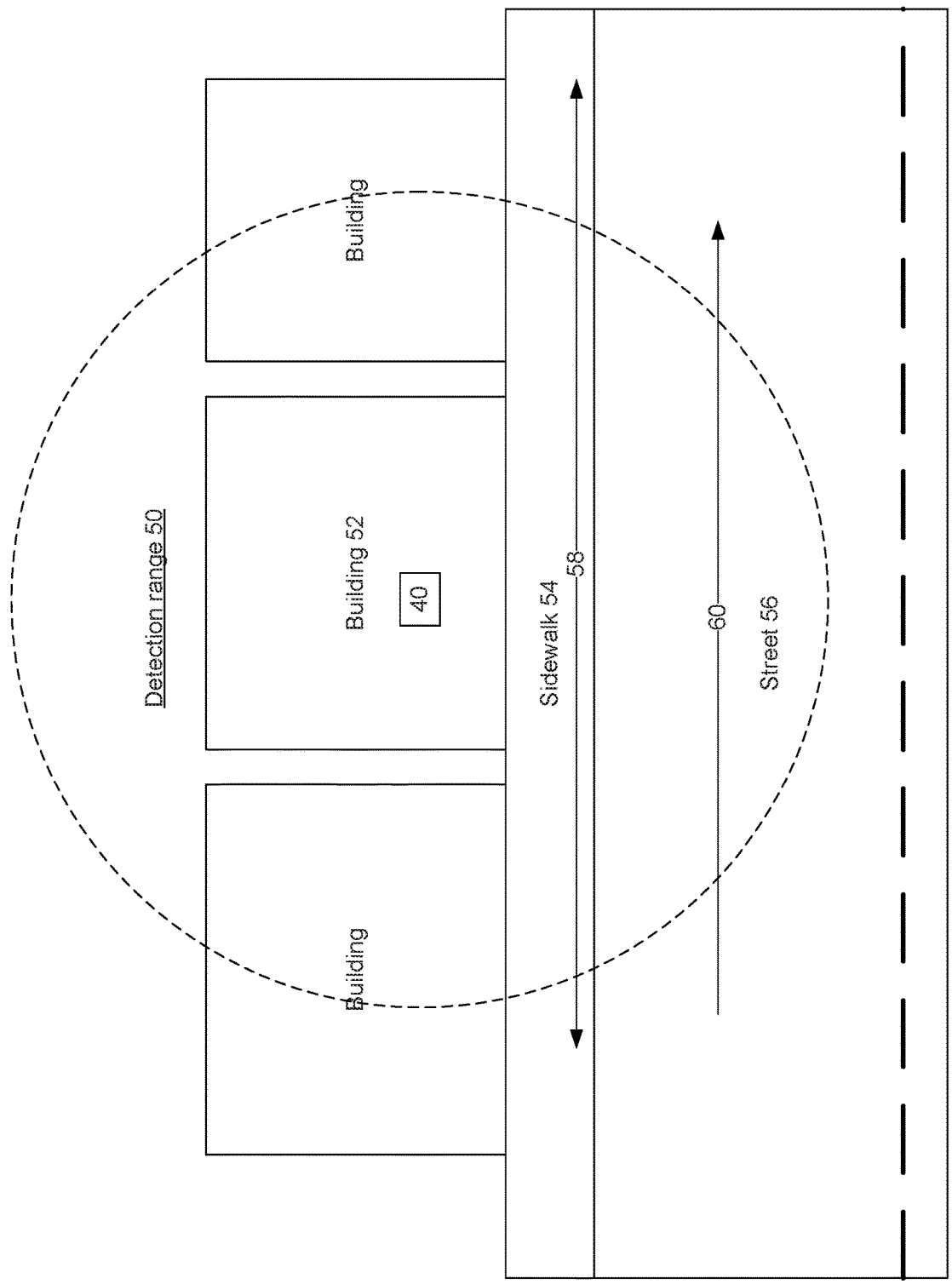
FIG. 28 is a graphical representation that demonstrates how known placement of sensors combined with raw data may provide approximation insight.

FIG. 28 is a graphical representation that demonstrates how known placement of sensors combined with raw data may provide approximation insight. Given a particular placement where a sensor 40 is positioned in a location with known geography, or where the sensors are placed within a scheme geographically (e.g., at least 15 yards from the nearest street), the raw data may be used to quickly approximate statistics.

A sensor 40, having detection range 50 (depicted by a dotted circle) is placed in a building 52. Outside the building is a sidewalk 54 and a street 56. Pedestrians walking on the sidewalk on path 58 will naturally come closer to the sensor 40 than the drivers of automobiles on the street on driving path 60. Therefore, the system knows that drivers will never have greater than a certain connection strength to the sensor with their mobile devices. Conversely, pedestrians on the sidewalk will have a stronger maximum signal strength. Further, pedestrians who enter the building 52 and approach a display the sensor is positioned on will have a third maximum signal strength. Other geographies lend to the determination of other statistics.

Using this geographic tendency, a subset of the data may be selected (time range and sensors/group of sensors selected). The system does not have perform an exact count of each and may instead apply a function to generate the approximation. For example, in some embodiments if w is the path 58 (visits far away/visits close) rate, then as an example of trained data the: % of cars=0.8−w*0.6.

Recurrence distribution is another statistic that can be approximated via the raw data. Recurrence distribution refers to those people who revisited x times. This approximation enables the summarized data reports to be filtered for unique visitors, new visitors, or merely recurring visitors. The portion of the raw data used is the visit ID or device ID. In some embodiments, visitors are categorized as new or recurring through use of a Bloom Filter. Recurring visits plus unique visits will equal total visits. Recurring visitors exhibit a power law distribution that can be fit by the aggregate daily recurrence across origins and within an arbitrary time range. In some deployments, the time range and points of origin are chosen to be representative as described above. Where:

Given a time period starting $t_{start}$ and ending $t_{end}$

Given a group G of sensors (=locations)

Let $v_i$ be the number of visitors who visited i times any of the sensors in G, between $t_{start}$ and $t_{end}$ Let $N=\Sigma i*v_i$=total number of visits, and $N_{rec}$ the subset of visits that are recurrent (visits which are not the first visit of that individual or device ID)

Let r be the group recurrence rate at time $t_{end}$, i.e. $r=N_{rec}/N$

The system assumes that $v_i$ follows a power law distribution with parameters C and y where C is the number of visitors who visited any of the sensors in G only once and y is the speed of the decrease in the distribution of $v_i$. When y is higher than C people tend to visit less frequently:

$v_i = C/i^y$

Therefore, the following relationships exist:

$$N = \Sigma i * C/i^y = \Sigma C/i^{(y-1)} = C*\zeta(y-1) \text{ (Riemann zeta function)} \quad 1.$$

$$r = N_{rec}/N = ((i-1)*C/i^y)/N = 1 - \zeta(y)/\zeta(y-1) \quad 2.$$

Solving the equations derives values for $v_i$. In some embodiments, the distribution may be revisited on a periodic basis (e.g., daily).

FIG. 29 is a sample network probe 72. Mobile devices operating in the WiFi protocol periodically transmit network probes 72 requesting local networks to respond with identification. If the mobile device recognizes the network, the device and network move to authentication procedures and form a connection. Network probes 72 are not requested, and may be received passively by nearby sensors without interaction or alerting any nearby mobile device to the presence of the sensor/sniffer. Each network probe 72 at least has a source address 74, a sequence number 76, and a capabilities list 78.

Modern combinations of device hardware and device operating software intentionally provide a fake MAC address for the source address 74. This is continually randomized with each network probe 72. The devices readily indicate that the MAC addresses are fake. The fake MAC addresses provided as a source address 74 in each network probe 72 is a security measure intended to prevent observers from identifying the specific device transmitting the network probe 72.

The list of capabilities 78 helps identify a make and model of a given mobile device. This list 78 is a part of the 802.11 protocol specification and is not faked as the source addresses 74 are. Each type of mobile device has a profile that is represented by the list of capabilities 78. A sensor may be programmed to include each of these profiles for mobile devices in circulation. Using the list of capabilities 78, received network probes 72 having disparate and fake Mac addresses are grouped/correlated by make and model of mobile device. This data alone does not provide an accurate count of devices. This is because the chance that multiple people in a given area have the same make and model of devices is high, especially for particularly popular devices.

Unlike the source address 74, the sequence number 76 of a network probe 72 is not randomized. Network probes 72 transmitted by a particular device will have consecutive sequence numbers 76. Thus, despite the network probes 72 having randomized source addresses 74, the sequence numbers 76 for a series of probes 72 may be correlated. When the sequence numbers 76 of network probes 72 that have matching capabilities lists 78 (e.g., devices of the same make and model) are similar or neighboring it is likely these network probes 42 were emitted by the same device.

The terms "similar" or "neighboring" in this case are subjective and based on a desired accuracy of the particular deployment. While network probes 72 are emitted with consecutive sequence numbers 76, the sensor may not receive all the network probes 72, or process the network probes 72 in the order they were emitted. Thus, in some embodiments, the sensor correlates network probes 72 with neighboring sequence numbers 76. Consecutive sequence numbers are considered a more specific implementation of neighboring sequence numbers.

How close sequence numbers need be to determine whether the sequence numbers neighbor one another is dependent on desired accuracy and expected device detections. If the sensor is expected to track relatively few devices at a time, neighboring can refer to a relatively wide spectrum of the available values for the sequence number 76. Conversely, if the sensor is expected to detect a large number of devices at a time, then neighboring is configured to occupy a narrower range (threshold) of sequence number values.

According to the current 802.11 protocol specification, the sequence number is a 2-byte number. This means the sequence number has $2^{16}$, or 65,536 possible values to cycle through. The chance that a given mobile device is at the same or similar/neighboring location in the cycle of sequence numbers is quite low; however, when counting a large enough number of mobile devices, that chance is significant enough to cause duplicates. Despite the chance of duplicates there is some ability to differentiate. Where two separate network probes 72 have different source addresses 74, but identical sequence numbers 76 and capabilities lists 78, there are likely two devices present. This differentiation technique may be scaled to determine any number of devices in an area; however, this technique encounters issues where the frequency of network probes that are not detected is significant. Thus, differentiating based on detecting two probes that only differ by source address is not always reliable.

The technique to identify a number of devices via passive observation is to receive network probes 72 from local devices, then correlate based on sequence number 76, and capabilities list 78. Where there is a confluence of capabilities list 78 and neighboring sequence numbers 76, it is likely that a single device is emitting the network probes 72 despite having varied, random and fake MAC addresses used as the source addresses 74. This may be counted as a single device. This passive technique does not actually identify a real MAC address or any other real machine identifier for the single device—just that there exists a single device emitting network probes 72.

Figure 30:
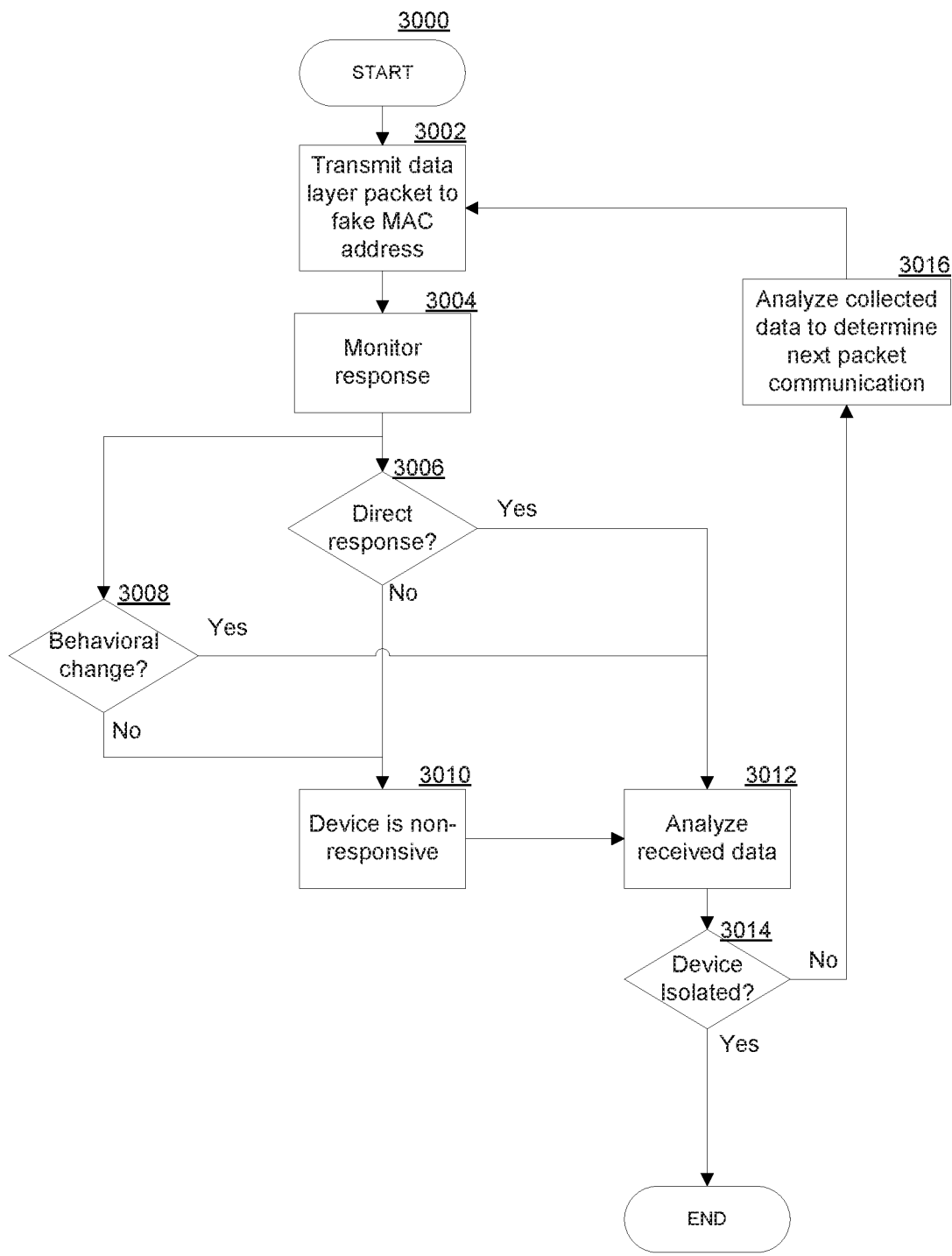
FIG. 30 is a flowchart of a method used to isolate a mobile device.

FIG. 30 is a flowchart of an embodiment of an active method to isolate a mobile device. Use of network probes pertains to passive device isolation. Other network packets are used to perform active device isolation. Active device isolation involves soliciting a response from the mobile devices. In step 3002, the scanner transmits a data link layer packet. The data link layer packet can include any of the sorts of packets interpreted at the data link layer according to protocol. Examples include RTS/CTS packets, authentication packets, and disassociation packets.

In step 3004, the scanner monitors the response to the data link layer packet. In step 3006, the scanner determines if there was a direct response to the data link layer packet. A direct response is a response packet or probe directed to the scanner. The direct response may include a real MAC address, some other machine identifier, or some other information regarding the behavior of a particular make and model of device. In step 3008, the scanner determines whether the mobile device has exhibited any change in its respective behavior. Behavior includes (but is not limited to) the transmission of other packets, a change in the character of the network probes or the rate of the network probes emitted by the device. In step 3010, where no direct response or behavioral change is observed, the scanner determines that the device is non-responsive (which is a type of a response).

In step 3012, responses of all types (e.g., metadata) are analyzed by the system to determine whether the response data further isolates one device from another device that was found in the passive scan. The analysis of step 3012 is not necessarily performed in isolation. The responses of a device to packets sent to a first fake MAC address (source address) are similarly compared to responses to packets sent to a second fake MAC address. This is because the communication may in fact be to the same device, or multiple devices. Transmission between the first and second fake MAC addresses may be staggered in order to properly observe (control) behavioral changes.

For example, a behavioral change in a given device is to slow the rate of network probe transmission; this change has occurred after transmitting a data link layer packet to the first fake MAC. If after transmitting the same type of packet to the second fake MAC causes no response, it is possible that there is a single device emitting network probes and the behavioral change in response to the first data link layer packet has already occurred and will not occur a second time. The behavioral responses of given makes and models of devices are testable and known. In an implementation of this system, such responses may either be pre-programmed in, or observed and iterated based on a hidden Markov model (e.g., machine learning).

In step 3014, if a given device is isolated, the active scan is complete and the device may be counted based on the device signature developed (as determined by the responses to data link layer packets). In step 3016, where a device was not isolated to an acceptable threshold of certainty, the system determines what sort of packet to send next to isolate a device. This determination is made based on the capabilities list as observed during passive scanning as well as the analysis of step 3012. Step 3016 leads back into step 3002, where a new type of data link layer packet is transmitted to a selected source address. For example, if the first round involved an RTS/CTS inquiry, the second round may involve either a disassociation or authentication packet. This cycle continues until a device is isolated.

Figure 31:
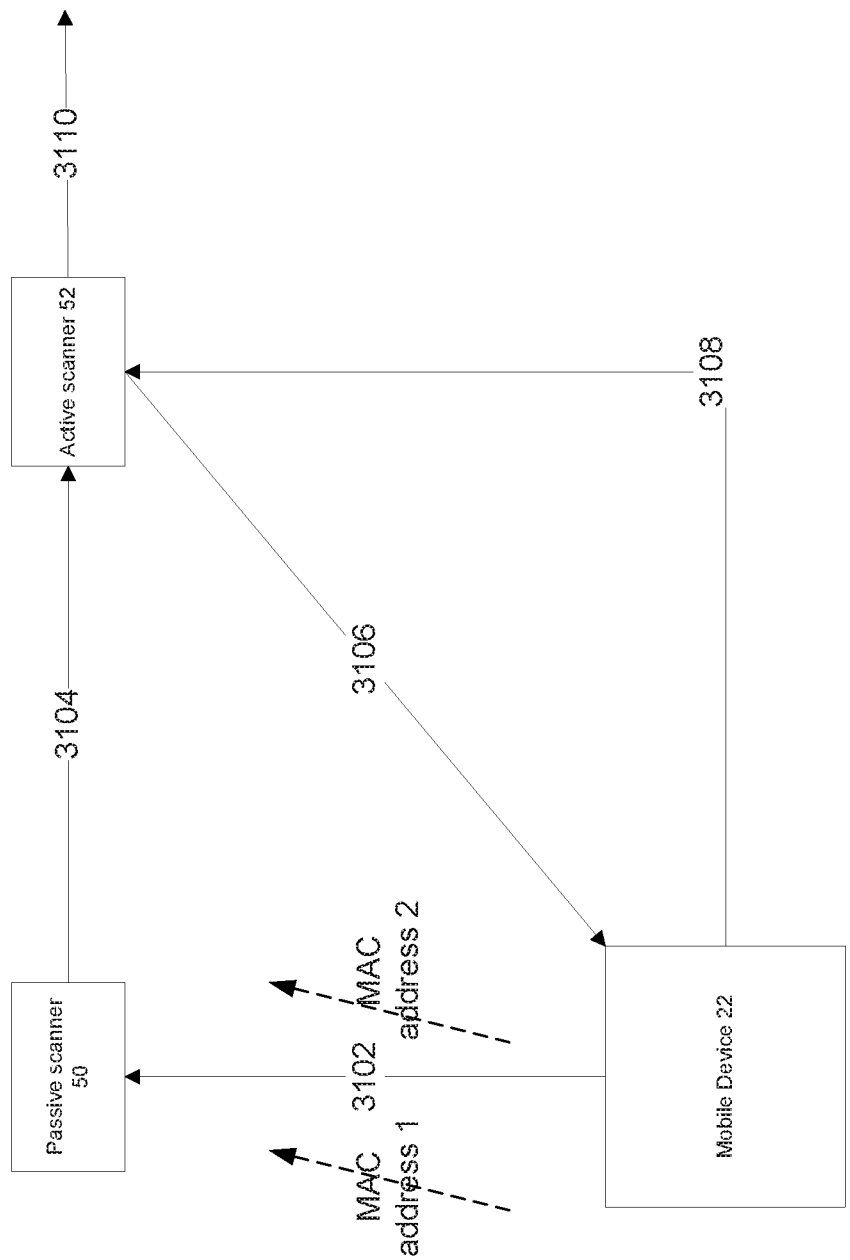
FIG. 31 is a flow diagram of a method for both actively and passively generating a signature for a mobile device.

FIG. 31 is a flow diagram of a method for both actively and passively generating a signature for a mobile device. In step 3102, a mobile device 22 emits network probes periodically soliciting wireless networks. The network probes are emitted using a variety of randomized MAC addresses as source addresses. The passive scanner 50 receives these network probes. The passive scanner 50 is an embodiment of the scanner 24 as discussed with reference to FIG. 1.

In step 3104, the passive scanner 50 generates a signature for the mobile device based on the content of the network probes (e.g., correlating probes by capabilities list and sequence number). Groups of network probes that the passive scanner 50 determines are emitted from a single, isolated device are a passive fingerprint of that device. In step 3106, the active scanner 52 transmits data layer packets to one or more of the fake MAC addresses identified in the network probes. The active scanner 52 is an embodiment of the scanner 24. The components of the passive scanner 50 and the active scanner 52 may be included in a single scanner 24 or spread across multiple scanners 24.

The data layer packets transmitted by the active scanner 52 include request channel (RTS) and clear channel (CTS) packets, authentication packets, dissociation packets, and other suitable packets for directing network traffic and communication. In step 3108, the mobile device 22 responds to the data layer packets. In step 3110, the response to the data layer packets is used to further enhance the isolated device signature. Steps 3106 and 3108 may proceed in a number of rounds including multiple packet types.

For example, a first round of 3106 may include the transmission of an RTS packet. A first round of 3108 may include receiving a CTS packet, no response, or an alteration in the behavior of the mobile device 22. These responses may be compared to the capabilities list of network probes that the RTS packet was sent to in order to provide context to the response. Particular makes and models of devices have predictable behaviors in response to data layer packets, thus the selection of the data layer packet and the manner in which the response thereto is interpreted is influenced by the make and model of the mobile device.

In some circumstances the CTS packet will include a real MAC address. When this occurs, the device is successfully isolated and may be counted. The device may not respond, and in this case, further rounds of steps 3106/3108 are used to isolate the device. Alternatively, the mobile device may react behaviorally to the RTS packet. For instance, a behavioral change includes a change in the rate of network probe generation (e.g., slower).

Changing the rate of network probe generation helps distinguish devices that coincidentally are at similar stages in a cycle of sequence numbers within their respective network probes. An alteration in the rate of network probe generation will cause the devices to diverge from one another in the sequence numbers of network probes. Where two devices of the same make and model are in the same neighborhood for sequence numbers, for example, where the most recent probes received by two devices having the same capabilities list are sequenced 1938 and 1942, a behavioral change in the device that transmitted "1942" is observed as receiving 1943, 1944, etc. a distinguishing period after the device that emitted 1938 will have emitted those same sequence numbers.

Alternatively, the specific rate of network probe generation provides identifying information. Capabilities lists are not always definitive as to make and model (depending on the make and model). Thus, there may be multiple makes and models of devices that have the same capabilities list. However, monitoring the manner in which the devices respond to input can provide further identifying details in the make and model. The behavioral changes may be a result of the exact manner in which the WiFi chip or network card is implemented in the particular make and model of device. The time it takes the device to generate a new randomized fake MAC address and transmit a network probe may be indicative of the make and model and thus, though two devices may have the same capabilities list, they may be differentiated by behavioral changes, thus isolating those devices for counting.

Based on the response (or lack thereof) of the first round of steps 3106 and 3108, there are additional rounds of these steps. Some devices do not respond RTS/CTS inquiries, and thus other data layer packets are used. Based on the capabilities list as well as the response to the RTS/CTS inquiry, the active scanner 52 transmits an authentication or disassociation packet to the mobile device (via the fake source address). The active scanner 52 is monitoring for a similar set of responses as with the RTS/CTS inquiry: direct response, no response, or a change in behavior. Based on the sum total of the observed data from the passive observation and the multiple rounds of active observation a mobile device will be isolated. The isolation is performed by comparing the observed data to expected response profiles of known mobile devices.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

The invention claimed is:

1. A method for monitoring a visitor count in a domicile and reporting the visitor count to a user comprising:
   detecting, by a network transceiver, device identifiers from mobile devices, wherein the network transceiver is configured to scan one or more frequencies and further configured to collect device identifiers from the mobile devices;
   determining the number of unique device identifiers exceeds a predetermined threshold;
   receiving resident instructions including a number of resident devices;
   transmitting the resident instructions;
   reducing the number of unique device identifiers by the number of resident devices;
   transmitting a notification to a user device indicating the predetermined threshold has been exceeded;
   communicating the number of unique device identifiers to the user device; and
   rendering, on the user device, the number of unique device identifiers.

2. The method of claim 1, further comprising:
   broadcasting, by the network transceiver, a signal causing nearby mobile devices to emit device broadcasts.

3. The method of claim 1, wherein the one or more frequencies comprises wireless frequencies.

4. The method of claim 1, wherein the one or more frequencies comprises cellular frequencies.

5. The method of claim 1, further comprising:
   identifying, from the device identifiers, a number of resident device identifiers associated with resident devices, wherein the resident devices identifiers are those device identifiers that exceed a threshold for frequency of detection; and
   reducing the number of unique device identifiers by the number of resident device identifiers.

6. The method of claim 1, further comprising:
   transmitting a push notification or SMS message to the user device when the number of unique devices is below a threshold.

7. The method of claim 1, wherein the domicile is a rental property, and the network transceiver is installed in the rental property.

8. The method of claim 7, further comprising
   analyzing a rental calendar associated with the rental property for a current rental status; and
   adjusting the predetermined threshold based on the current rental status.

9. The method of claim 1, wherein said detecting step further comprises:
   determining a device type for each of the mobile devices based on a comparison of each device identifier to an identifier schema; and
   ignoring all mobile devices that do not have the device type of "phone".

10. The method of claim 1, further comprising communicating a number of unique device identifiers to a web server.

11. The method of claim 10, wherein the web server transmits the notification the user device.

12. The method of claim 10, wherein a mobile application receives resident instructions and transmits the resident instructions to the web server.

13. A method for monitoring a visitor count in a rental property and reporting the visitor count to a user comprising:
   detecting, by a network transceiver installed in the rental property, device identifiers from mobile devices, wherein the network transceiver is configured to scan one or more frequencies and further configured to collect device identifiers from the mobile devices;
   determining the number of unique device identifiers exceeds a predetermined threshold;
   analyzing a rental calendar associated with the rental property for a current rental status;
   adjusting the predetermined threshold based on the current rental status;
   transmitting a notification to a user device indicating the predetermined threshold has been exceeded;
   communicating the number of unique device identifiers to the user device; and
   rendering, on the user device, the number of unique device identifiers.

14. The method of claim 13, further comprising:
   broadcasting, by the network transceiver, a signal causing nearby mobile devices to emit device broadcasts.

15. The method of claim 13, wherein the one or more frequencies comprises wireless frequencies or cellular frequencies.

16. The method of claim 13, further comprising:
   identifying, from the device identifiers, a number of resident device identifiers associated with resident devices, wherein the resident devices identifiers are those device identifiers that exceed a threshold for frequency of detection; and
   reducing the number of unique device identifiers by the number of resident device identifiers.

17. The method of claim 13, further comprising:
   receiving resident instructions including a number of resident devices;
   transmitting the resident instructions; and
   reducing the number of unique device identifiers by the number of resident devices.

18. The method of claim 13, further comprising:
   transmitting a push notification or SMS message to the user device when the number of unique devices is below a threshold.

19. The method of claim 13, wherein said detecting step further comprises:
   determining a device type for each of the mobile devices based on a comparison of each device identifier to an identifier schema; and ignoring all mobile devices that do not have the device type of "phone".

20. The method of claim 13, further comprising communicating a number of unique device identifiers to a web server, wherein the web server transmits the notification the user device or a mobile application receives resident instructions and transmits the resident instructions to the web server.

\* \* \* \* \*